US008630271B2

(12) United States Patent
Kakumaru

(10) Patent No.: US 8,630,271 B2
(45) Date of Patent: Jan. 14, 2014

(54) COMMUNICATION DEVICE, COMMUNICATION SYSTEM, COMMUNICATION METHOD AND COMMUNICATION PROGRAM

(75) Inventor: Takahiro Kakumaru, Tokyo (JP)

(73) Assignee: NEC Corporation, Tokyo (JP)

( * ) Notice: Subject to any disclaimer, the term of this patent is extended or adjusted under 35 U.S.C. 154(b) by 1137 days.

(21) Appl. No.: 12/311,117

(22) PCT Filed: Oct. 9, 2007

(86) PCT No.: PCT/JP2007/070035
§ 371 (c)(1),
(2), (4) Date: Sep. 3, 2009

(87) PCT Pub. No.: WO2008/044790
PCT Pub. Date: Apr. 17, 2008

(65) Prior Publication Data
US 2010/0040030 A1 Feb. 18, 2010

(30) Foreign Application Priority Data

Oct. 6, 2006 (JP) ................................. 2006-274701

(51) Int. Cl.
H04W 4/00 (2009.01)
(52) U.S. Cl.
USPC ......................................................... 370/338
(58) Field of Classification Search
USPC ......................................................... 370/338
See application file for complete search history.

(56) References Cited

U.S. PATENT DOCUMENTS

| 5,086,467 | A  | * | 2/1992  | Malek         | 380/252   |
|-----------|----|---|---------|---------------|-----------|
| 6,243,579 | B1 | * | 6/2001  | Kari          | 455/426.1 |
| 6,502,135 | B1 | * | 12/2002 | Munger et al. | 709/225   |
| 6,917,974 | B1 | * | 7/2005  | Stytz et al.  | 709/225   |
| 2003/0204717 | A1 | * | 10/2003 | Kuehnel    | 713/150   |
| 2003/0208618 | A1 | * | 11/2003 | Mor et al. | 709/238   |
| 2004/0042576 | A1 | * | 3/2004  | Anderson   | 375/365   |

(Continued)

FOREIGN PATENT DOCUMENTS

EP  1 484 892 A2  12/2004
JP  2003-143132   5/2003

(Continued)

OTHER PUBLICATIONS

Japanese Office Action dated Apr. 12, 2012, with partial English translation.

(Continued)

Primary Examiner — Asad Nawaz
Assistant Examiner — Saad A Waqas
(74) Attorney, Agent, or Firm — McGinn IP Law Group, PLLC

(57) ABSTRACT

The object is to prevent a third party from specifying a condition of data communication executed by a radio terminal in a radio network using a radio communication device easily accessible to anyone such as WLAN. The radio base station 2 comprises a unit which determines whether to transmit a pseudo data frame assumed to be actual data communication according to a condition of data communication with the radio terminal 3 and a unit which stores information which is information for generating a pseudo data frame and based on actual data communication with the radio terminal 3, thereby generating and transmitting a pseudo data frame based on the stored information when starting pseudo data frame transmission.

49 Claims, 15 Drawing Sheets

(56) References Cited

U.S. PATENT DOCUMENTS

| | | | |
|---|---|---|---|
| 2006/0047907 A1* | 3/2006 | Shiga et al. | 711/114 |
| 2006/0153240 A1 | 7/2006 | Kikuma | |
| 2007/0280686 A1* | 12/2007 | Amemiya et al. | 398/51 |
| 2010/0296441 A1* | 11/2010 | Barkan | 370/328 |

FOREIGN PATENT DOCUMENTS

| | | |
|---|---|---|
| JP | 2004-289875 | 10/2004 |
| JP | 2006-94394 | 4/2006 |
| JP | 2006-197045 | 7/2006 |

OTHER PUBLICATIONS

European Search Report dated Jan. 2, 2012.
"Normalizing traffic pattern with anonymity for mission critical applications", Simulation Symposium, 2004. Proceedings. 37$^{th}$ Annual Arlington, VA, USA Apr. 18-22, 2004, Piscataway, NJ, USA, IEEE, Apr. 18, 2004, pp. 293-299, XP010706396, DOI: 10.1109/SIMSYM.2004.1299494 ISBN: 978-0-7695-2110-7.

* cited by examiner

FIG. 11

PSEUDO DATA TYPE STORAGE UNIT ~73

PSEUDO DATA TYPE /731

| NUMBER (G1) | DATA FRAME TYPE (G2) | DATA SIZE (G3) | DATA TRANSMISSION DIRECTION (G4) |
|---|---|---|---|
| 1 | 802.11 DATA FRAME | 208 BYTES | DEVICE 1→DEVICE 2 |
| 2 | 802.11 ACK FRAME | 0 BYTE | DEVICE 2→DEVICE 1 |
| 3 | 802.11 DATA FRAME | 208 BYTES | DEVICE 2→DEVICE 1 |
| 4 | 802.11 ACK FRAME | 0 BYTE | DEVICE 1→DEVICE 2 |

FIG. 12

PSEUDO DATA TYPE STORAGE UNIT ~73

APPLICATION INFORMATION /732

| NUMBER (H1) | APPLICATION TYPE (H2) | ON/OFF (H3) |
|---|---|---|
| 1 | VOICE CALL | ON |
| 2 | INTERNET TV | ON |
| 3 | MAIL ACQUISITION | ON |
| 4 | WEB ACCESS | OFF |

COMMUNICATION DEVICE, COMMUNICATION SYSTEM, COMMUNICATION METHOD AND COMMUNICATION PROGRAM

TECHNICAL FIELD

The present invention relates to a communication device, a communication system, a communication method and a communication program and, more particularly, a communication device, a communication system, a communication method and a communication program which enable transmission of pseudo data supposed as actual data communication.

BACKGROUND ART

In recent years, various radio communication devices including WLAN (Wireless Local Area Network) are mounted on a wide variety of apparatuses such as a personal computer, a peripheral equipment, a cellular phone, a game player, an STB (Set Top Box) and a CE (Consumer Electronics) apparatus such as a TV set, which come into use in various places including ordinary houses. Among possible reasons for widespread use of the devices, one is that although the device is a radio device emitting radio waves, no license is required for its use and it is relatively reasonable enough to be accessible to everyone.

With a device accessible to everyone, safety of a communication path between radio sections and access control for preventing use at will are crucial. Under these circumstances, the mechanism of encryption of a communication path between radio sections and the mechanism of authentication at the time of use are taken into consideration.

Although it is difficult to comprehend the contents of data communication because of encryption of data communication, the fact that data communication being executed cannot be hidden. There also exists a case where by comprehending an interval or timing at which a data frame is transmitted and received in data communication, and a data size, it is possible to presume by which application the communication is being executed. Assume, for example, that a data frame of approximately 300 bytes are interactively transmitted and received at an interval of several tens of times per second. In this case, it can be considered that voice call is being made.

In communication over a cable network, since data can be obtained only by a device physically connected to the network, it is highly unlikely that data is obtained by an unintended third party. With respect to a problem that devices on the same L2 layer are allowed to obtain communication data of other device, while data has been initially transmitted to all the devices on the same L2 layer by the use of a device called a shared hub, use of a device called a switching hub enables transmission of data only to a least necessary port. Accordingly, no further consideration is required for solving the problem.

Among representative devices using radio communication is a cellular phone. A radio communication system used for a cellular phone, however, requires a license for emitting radio waves and requires a special device not reasonable for transmitting and receiving radio waves, so that it is not easily accessible to everyone. No consideration is required for solving the problem as well.

In other words, there exists a problem that when a unit having a device using a radio communication system which allows such data communication conditions as described above to be seized is put into practical use in an ordinary house by the use of such a device accessible to everyone as WLAN, for example, seizing data communication conditions at site by an unintended third party leads to comprehending which kind of data communication being executed, or a problem of privacy that existence of a person himself/herself can be presumed by the existence/non-existence of data communication. In a case where such a radio communication device is used that is mounted with a radio communication system by which a MAC address inherently applied to a terminal is ordinarily transmitted and received without its encryption on a radio section as a WLAN, the problem becomes more conspicuous.

One example of related radio devices is disclosed in Literature 1 (Japanese Patent Laying-Open No. 2004-289875). Disclosed in Literature 1 is a cellular phone which requires no dedicated starting switch, is adaptable to an existing cellular phone and has a security function that makes release of pseudo calling operation difficult by others than an owner. With the cellular phone having a security function, an alarm sound stops only when an operation button is continuously pressed for a predetermined period of time, when it is pressed by a predetermined number of times or when a predetermined code number is entered, and it fails to stop even when other button than the operation button is pressed or when other number than a predetermined code number is entered, which allows only an owner of the cellular phone with the security function to release the alarm sound with ease.

Literature 1: Japanese Patent Laying-Open No. 2004-289875.

The radio communication system including the technique disclosed in Literature 1 has the following problems.

The first problem is that data transmission conditions in a radio terminal having a radio communication device cannot be hidden. The reason is that the radio communication system recited in Literature 1 is allowed to receive communication of other radio device communicating on the same channel than its own radio device with ease.

The second problem is that when data communication is enciphered, although it is highly unlikely to obtain contents of the data communication, it is impossible to prevent presumption of which application realizes the data communication based on a data communication flow. The reason is the same as that of the first problem.

The third problem is that non-existence of a radio device might be presumed based on a failure of observation of data communication. The reason, which is the same as that of the first problem, is that conversely when no data communication is observed, it is possible to presume that there fails to exist a radio device.

The fourth problem is that flexible generation and transmission of a pseudo data frame is impossible for making it difficult to specify actual data communication. The reason is that no consideration is given to a pseudo data frame in the radio communication system recited in Literature 1.

OBJECT

An object of the present invention is thus to provide a communication device which makes it difficult to specify actual data communication on the communication device.

Another object of the present invention is to provide a communication device which enables a communication device to look like being in data communication when it is not.

SUMMARY

According to a first exemplary aspect of the invention, a communication device, includes a communication unit, and a pseudo data transmission unit which transmits pseudo data that is a pseudo of true data in communication between the communication devices.

According to a second exemplary aspect of the invention, a communication method in a communication device having a communication unit, includes a step of transmitting pseudo data that is a pseudo of true data in communication between the communication devices.

According to a third exemplary aspect of the invention, a communication program executed on a communication device having a communication unit, comprises a function of transmitting pseudo data that is a pseudo of true data in communication between the communication devices.

The present invention which makes it hard to specify actual data communication between communication devices and makes data communication look like being in execution when no actual data communication is being executed between the communication devices.

BRIEF DESCRIPTION OF THE DRAWINGS

FIG. 11 is a diagram showing a further detailed structure of a pseudo data type storage unit according to the second exemplary embodiment;

FIG. 12 is a diagram showing a structure of a pseudo data type storage unit according to a third exemplary embodiment of the present invention;

EXEMPLARY EMBODIMENT

Next, best modes for implementing the present invention will be described in detail with reference to the drawings.

Structure of First Exemplary Embodiment

Figure 1:
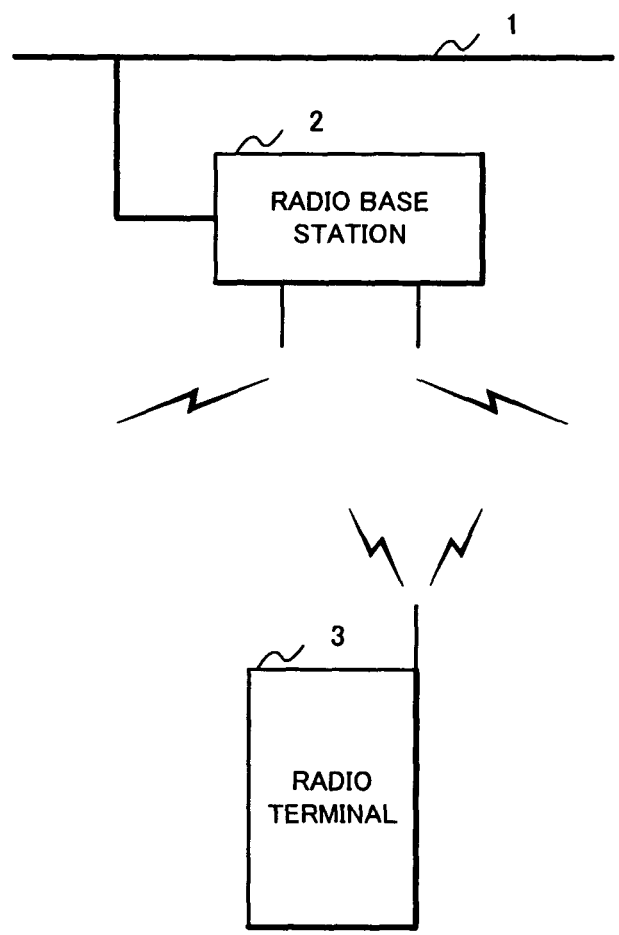
FIG. 1 is a block diagram showing a structure of a radio communication system according to a first exemplary embodiment of the present invention.

FIG. 1 is a diagram showing a structure of a radio communication system according to a first exemplary embodiment of the present invention.

With reference to FIG. 1, the radio communication system according to the first exemplary embodiment comprises a network 1 which connects a LAN (Local Area Network) circuit or a WAN (Wide Area Network) circuit or the like, a radio base station 2 connected to the network 1, and a radio terminal 3 connected to the network 1 through the radio base station 2 by means of radio as a transmission medium.

The radio base station 2 has a function as a base station based on the IEEE 802.11 standards, a function of executing connection negotiation in response to a connection negotiation request from the radio terminal 3 to relay data communication between the radio terminal 3 and a device connected to the network 1 upon completion of the connection negotiation, and other functions. More specifically, the radio base station 2 has a function approximately as follows as a base station based on the IEEE 802.11 standards. The radio base station 2 specifically comprises a function of establishing a communication path with the radio terminal 3 based on the IEEE 802.11 standards, a function of executing authentication with the radio terminal 3 as required, a function of enciphering a communication path with the radio terminal 3 as required, a function of managing the radio terminal 3, a function of executing data communication with the radio terminal 3 through the established communication path, and a function of relaying data between the radio terminal 3 and the network 1.

The radio base station 2 comprises a function of transmitting data (pseudo data) which is a pseudo of a data frame of data (true data) transmitted and received to/from the radio terminal 3 during ordinary data communication. The data which is a pseudo of a data frame as of data communication with the radio terminal 3 includes an 802.11 data frame, an 802.11 control frame and an 802.11 management frame which are transmitted from the radio base station 2 to the radio terminal 3. Also included are an 802.11 data frame, an 802.11 control frame and an 802.11 management frame which are conversely transmitted from the radio terminal 3 to the radio base station 2.

The radio terminal 3 has a function as a terminal based on the IEEE 802.11 standards, and comprises a function of executing communication using Internet protocol (IP) of a device connected to the network 1 through the radio base station 2, and other functions. More specifically, the radio terminal 3 has a function approximately as follows as a terminal based on the IEEE 802.11 standards. More specifically, the radio terminal 3 includes a function of establishing a communication path with the radio base station 2 based on the IEEE 802.11 standards, a function of executing authentication with the radio base station 2 as required, a function of enciphering a communication path with the radio base station 2 as required, and a function of executing data communication with the radio base station 2 through the established communication path.

The radio terminal 3 executes connection negotiation with the radio base station 2 by using a radio physical layer at the time of network communication through the radio base station 2 as required. At this time, there occurs a case where authentication processing or the like is additionally executed between the radio terminal 3 and the radio base station 2 as required. Upon completion of the connection negotiation, the radio terminal 3 is allowed to execute network communication through the radio base station 2.

Figure 2:
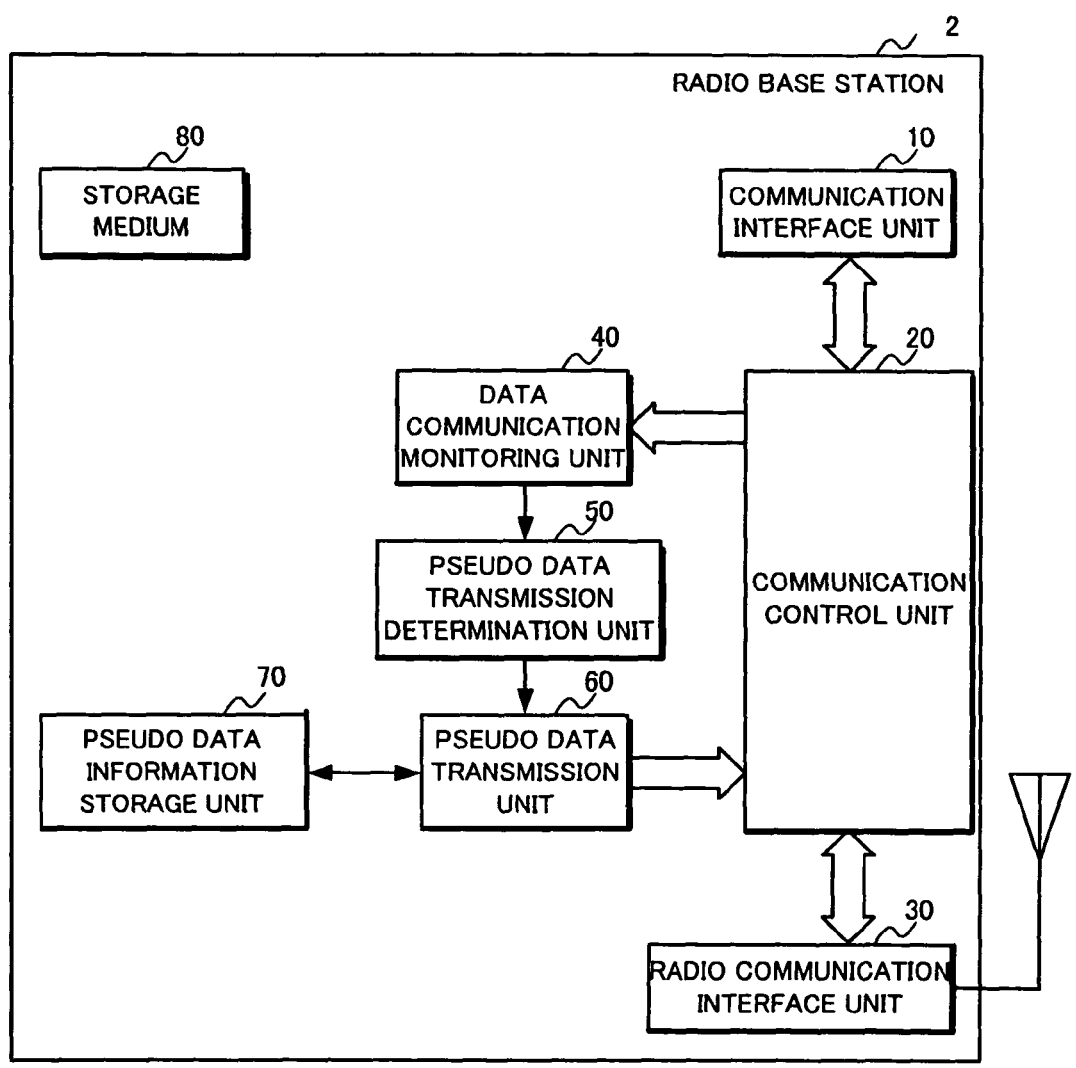
FIG. 2 is a block diagram showing a structure of a radio base station according to the first exemplary embodiment.

FIG. 2 is a block diagram showing a structure of the radio base station 2 illustrated in FIG. 1.

With reference to FIG. 2, the radio base station 2 comprises a communication interface unit 10, a communication control unit 20, a radio communication interface unit 30, a data communication monitoring unit 40, a pseudo data transmission determination unit 50, a pseudo data transmission unit 60, a pseudo data information storage unit 70 and a storage medium 80.

The communication interface unit 10 comprises a function of executing data communication with a device on the network 1 and other functions, and more specifically, comprises a function of transmitting data received from the communication control unit 20 to the network 1, a function of transferring data received from the network 1 to the communication control unit 20, and a function of transmitting and receiving data to/from a device on the network 1 connected to the communication interface unit 10 of the radio base station 2.

The communication control unit 20 comprises a function of managing a communication path with the radio terminal 3 through the radio communication interface unit 30 and giving a data transmission/reception instruction, a function of relaying data between the communication interface unit 10 and the radio communication interface unit 30 and other functions, and in more detail, comprises a function of taking charge of connection negotiation for establishing a communication path with the radio terminal 3 based on a connection request from the radio terminal 3 which is received from the radio communication interface unit 30 and charge of a series of security processing such as data encryption/decoding, a function of managing the radio terminal 3 connected, a function of realizing a data transmission/reception request to/from the radio terminal 3 with which a communication path is established, and a function of realizing a data transmission/reception request to/from a device on the network 1 through the communication interface unit 10.

The communication control unit 20 further has a function of transmitting pseudo data through the radio communication interface unit 30 upon receiving a pseudo data transmission request from the pseudo data transmission unit 60. In this case, the communication control unit 20 expects no ACK frame response to transmitted pseudo data. In other words, the communication control unit 20 comprises a function of refraining from retransmitting pseudo data in a pseudo data transmission mode in which a pseudo data transmission request is received from the pseudo data transmission unit 60. When not receiving an ACK frame in response to data transmission in ordinary radio communication, for example, the communication control unit 20 executes retransmission several times assuming that a communication partner is yet to receive data. The communication control unit 20 having transmitted pseudo data in the pseudo data transmission mode however executes no retransmission because a communication partner originally fails to exist, so that it fails to receive an ACK frame. Because the communication control unit 20 makes a pseudo out of not only a data frame but also an ACK frame, it comprises a function of making a pseudo out of an ACK frame to be successively received and transmitting the obtained frame.

The radio communication interface unit 30 comprises a function of transmitting and receiving data through a radio medium and other function and in more detail, comprises a function of transmitting data received from the communication control unit 20 via radio and a function of transferring data received via radio to the communication control unit 20.

The data communication monitoring unit 40 comprises a function of obtaining, through the communication control unit 20, data communication via the radio communication interface unit 30 and other functions, and in more detail, comprises a function of monitoring data communication made through the communication control unit 20 and a function of notifying communication data information related to communication data being monitored to the pseudo data transmission determination unit 50.

The pseudo data transmission determination unit 50 comprises a function of determining start and stop of pseudo data transmission based on data communication conditions obtained by the data communication monitoring unit 40 and other functions, and in more detail, comprises a function of determining start and stop of pseudo data transmission based on communication data information notified from the data communication monitoring unit 40, and a function of requesting the pseudo data transmission unit 60 to start pseudo data transmission when starting transmission of pseudo data and requesting the pseudo data transmission unit 60 to stop pseudo data transmission when stopping transmission of pseudo data.

The pseudo data transmission determination unit 50 may comprise a notification function of notifying the communication control unit 20 to the effect that it is in the pseudo data transmission mode because pseudo data transmission start is requested or to the effect that it is not in the pseudo data transmission mode because pseudo data transmission stop is requested. The notification function, to which no limitation is given in particular, may be to notify, when the pseudo data transmission determination unit 50 requests the pseudo data transmission unit 60 to start pseudo data transmission, the communication control unit 20 that it is in the pseudo data transmission mode and set the number of retransmissions by the communication control unit 20 to zero, or to notify the communication control unit 20 that it is in the pseudo data transmission mode by applying a flag indicative of setting the number of retransmissions by the communication control unit 20 to zero to pseudo data generated by the pseudo data transmission unit 60 and set the number of retransmissions by the communication control unit 20 to zero, or to notify the communication control unit 20 that it is not in the pseudo data transmission mode when requesting the pseudo data transmission unit 60 to stop transmission of pseudo data and set to return the number of retransmissions by the communication control unit 20 to the number as of before the pseudo data transmission mode.

Therefore, the communication control unit 20, when receiving a pseudo data transmission request from the pseudo data transmission unit 60 or when receiving a notification from the pseudo data transmission determination unit 50 that it is in the pseudo data transmission mode, recognizes that it is in the pseudo data transmission mode. By the notification function, the communication control unit 20 may determine to set the number of retransmissions to zero and execute such setting upon receiving a notification that it is in the pseudo data transmission mode, and upon receiving a notification that it is not in the pseudo data transmission mode, determine to return the number of retransmissions to the number of times as of before the pseudo data transmission mode and execute such setting. In addition, the pseudo data transmission unit 60 requested to start transmission of pseudo data may determine application of the above-described flag.

In more detailed description of each of the above-described functions, the pseudo data transmission determination unit 50 requests the pseudo data transmission unit 60 to start transmission of pseudo data upon determining to start pseudo data transmission based on its own holding timer value at a time point where the time of the timer value has elapsed after communication data information notified from the data communication monitoring unit 40 ceases, and requests the pseudo data transmission unit 60 to stop transmission of pseudo data upon determining to stop pseudo data transmission at a time point where communication data information notified from the data communication monitoring unit 40 again occurs. The timer value, whose settable timer value has no limitation, in particular, may be ten minutes, 30 minutes, one hour, or two hours, for example. Possible method is, with a range of numeric values set as a timer value, selection from the range of numeric values at random by the pseudo data transmission determination unit 50 each time. When a range between 10 minutes and one hour is set as a range of timer values, for example, selection may be made each time from the range at random. Also in this case, no limitation is placed on the range of settable timer values as a range.

The pseudo data transmission unit 60 has a function of generating pseudo data based on information of the pseudo data information storage unit 70 according to an instruction from the pseudo data transmission determination unit 50 and transmitting the pseudo data through the communication control unit 20 and other functions, and in more detail, comprises a function of transmitting pseudo data stored in the pseudo data information storage unit 70 through the radio communication interface unit 30 according to a request to the effect that transmission of pseudo data is to be started from the pseudo data transmission determination unit 50. For transmitting pseudo data through the radio communication interface unit 30, the pseudo data transmission unit 60 requests the communication control unit 20 to transmit pseudo data.

The pseudo data transmission unit 60 further has a function of continuing transmitting pseudo data stored in the pseudo data information storage unit 70 until receiving a request from the pseudo data transmission determination unit 50 to stop pseudo data transmission, which unit sequentially transmits all the pseudo data when a plurality of pieces of pseudo data exist in the pseudo data information storage unit 70. When finishing transmission of all the pseudo data of the pseudo data information storage unit 70, the pseudo data transmission unit 60 successively repeats transmission starting with the first pseudo data.

The pseudo data information storage unit 70 has a function of storing pseudo data transmitted by the pseudo data transmission unit 60. The pseudo data stored in the pseudo data information storage unit 70 is obtained by the pseudo data transmission unit 60. The pseudo data information storage unit 70 may store one pseudo data or a plurality of pieces of pseudo data. When transmitting and receiving data in radio communication, in general, an ACK (ACKnowledgement) frame as a response signifying that transmitted data is normally received is transmitted from a communication partner's terminal. The reverse is the same. For virtualizing data communication based on 802.11, at least two kinds of pseudo data are required, an 802.11 data frame and an 802.11 ACK frame as a response thereto.

The storage medium 80 comprises a function of storing a program for realizing the above-described processing of each unit.

Description will be here made of a hardware structure of the radio base station 2.

Figure 3:
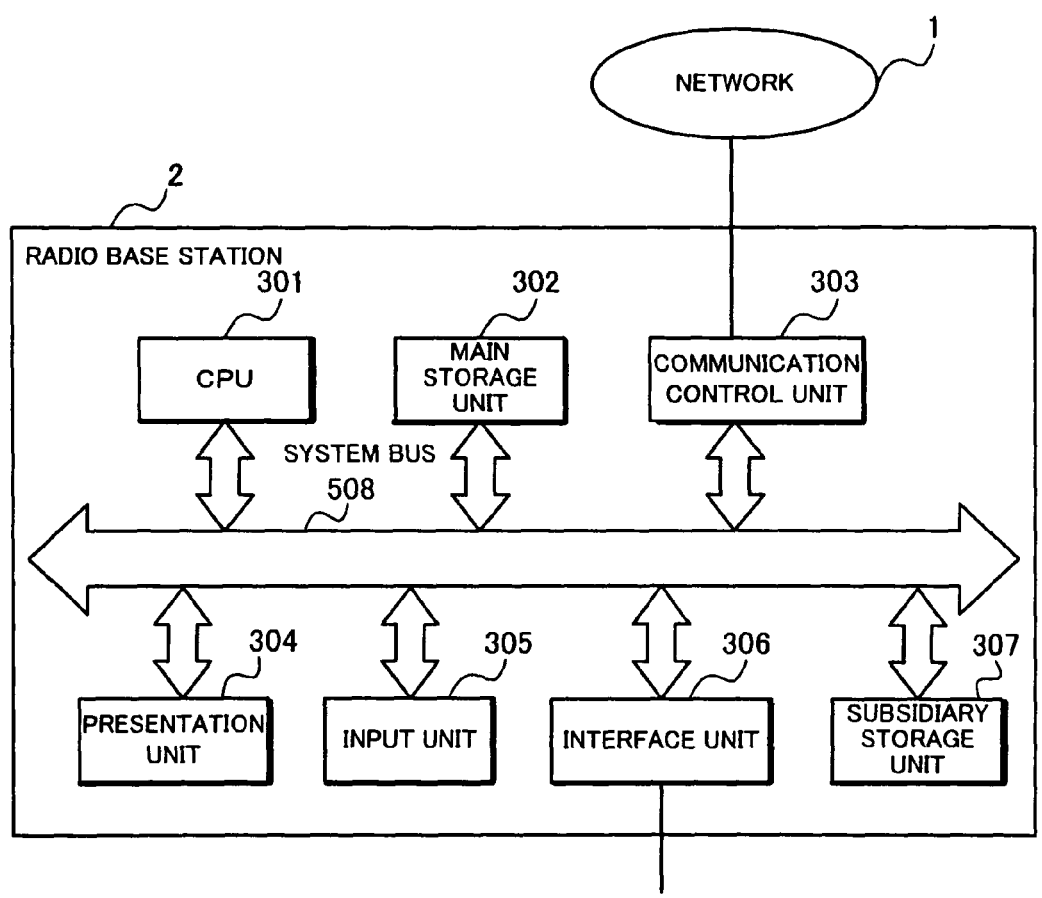
FIG. 3 is a block diagram showing a hardware structure of the radio base station according to the first exemplary embodiment.

FIG. 3 is a block diagram showing a hardware structure of the radio base station 2 of the radio communication system according to the present exemplary embodiment.

With reference to FIG. 3, the radio base station 2 according to the present exemplary embodiment, which can be realized by the same hardware structure as that of a common computer device, comprises a CPU (Central Processing unit) 301, a main storage unit 302 for use as a data working region or a data temporary saving region which is a main memory such as a RAM (Random Access Memory), a communication control unit 303 for transmitting/receiving data through a radio network through which radio communication is executed to/from the network 1 or the radio terminal 3, a presentation unit 304 such as a liquid crystal display, a printer or a speaker, an input unit 305 such as a keyboard or a mouse, an interface unit 306 connected to a peripheral apparatus for transmitting and receiving data, a subsidiary storage unit 307 (storage medium 80) which is a hard disc device formed of a ROM (Read Only Memory), a magnetic disc or a non-volatile memory such as a semiconductor memory, and a system bus 308 for connecting the above-described respective components of the present information processing device with each other.

The radio base station 2 has its operation realized not only as hardware with a circuit part mounted which is formed of a hardware part such as an LSI (Large Scale Integration) having a program realizing such functions as described above incorporated therein but also in software by executing a program providing each function of each of the above-described components by the CPU 301 on a computer processing device.

More specifically, the CPU 301 realizes each of the above-described functions in software by loading the program stored in the subsidiary storage unit 307 (storage medium 80) into the main storage unit 302 and executing the same to control operation of the radio base station 2. The radio terminal 3 or a radio detection device 4 which will be described later may have such a structure as described above to realize each of the above-described functions of the radio terminal 3 or the radio detection device 4 in hardware or software.

Operation of First Exemplary Embodiment

Next, with how data is transmitted and received at the radio base station 2 and the radio terminal 3 shown in FIG. 1 illustrated in the sequence diagram of FIG. 4, operation of the pseudo data transmission determination unit 50 at the radio base station 2 illustrated in the flow chart of FIG. 5 and operation of the pseudo data transmission unit 60 at the radio base station 2 illustrated in the flow chart of FIG. 6, detailed description will be made of operation of the radio communication system according to the present exemplary embodiment with reference to FIG. 1 through FIG. 6.

Figure 4:
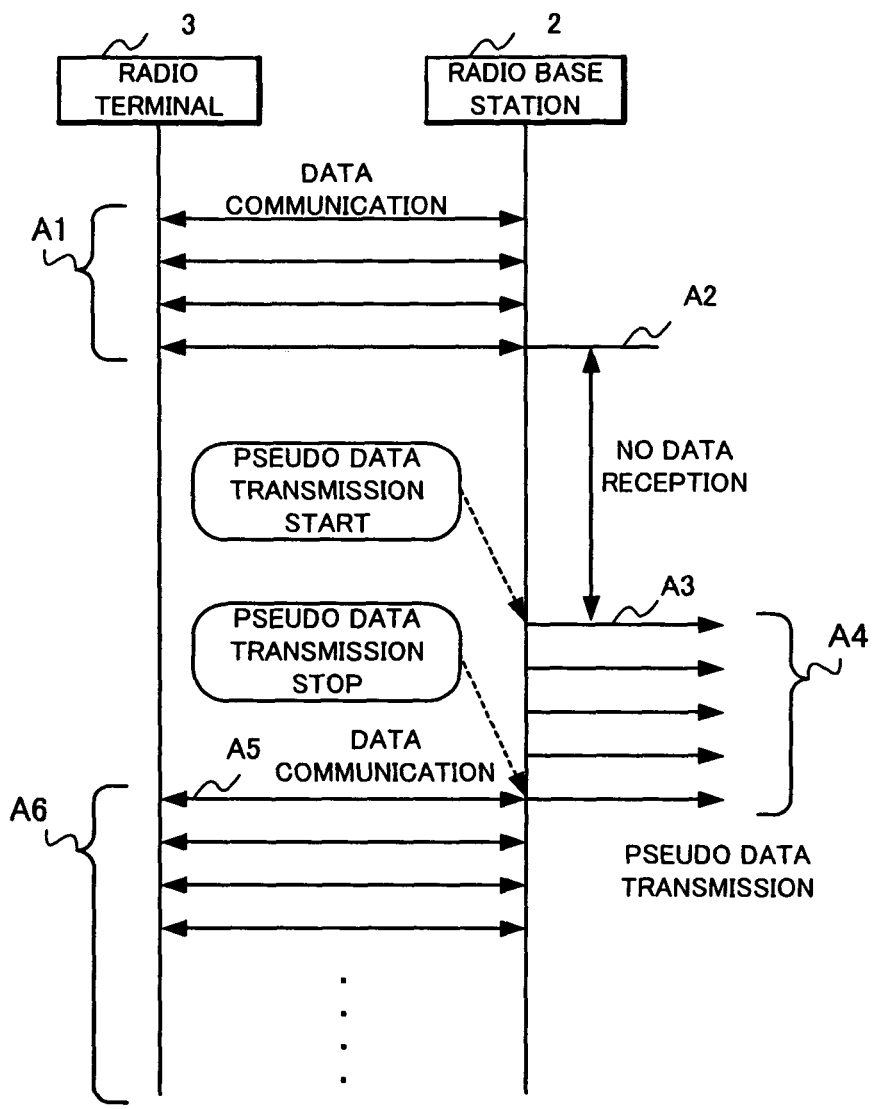
FIG. 4 is a sequence diagram showing data communication conditions between the radio base station and a radio terminal according to the first exemplary embodiment.
Figure 5:
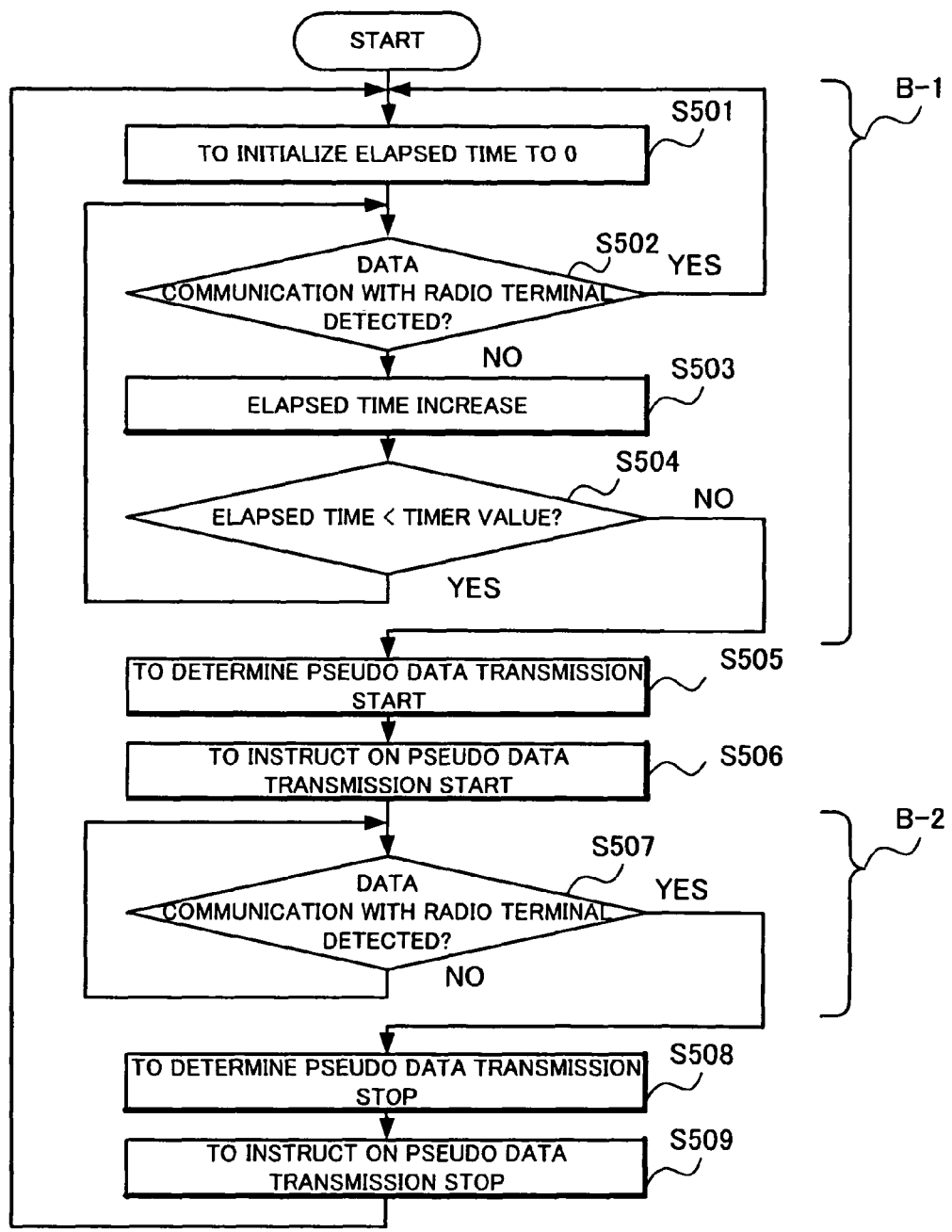
FIG. 5 is a flow chart showing operation of a pseudo data transmission determination unit according to the first exemplary embodiment.
Figure 6:
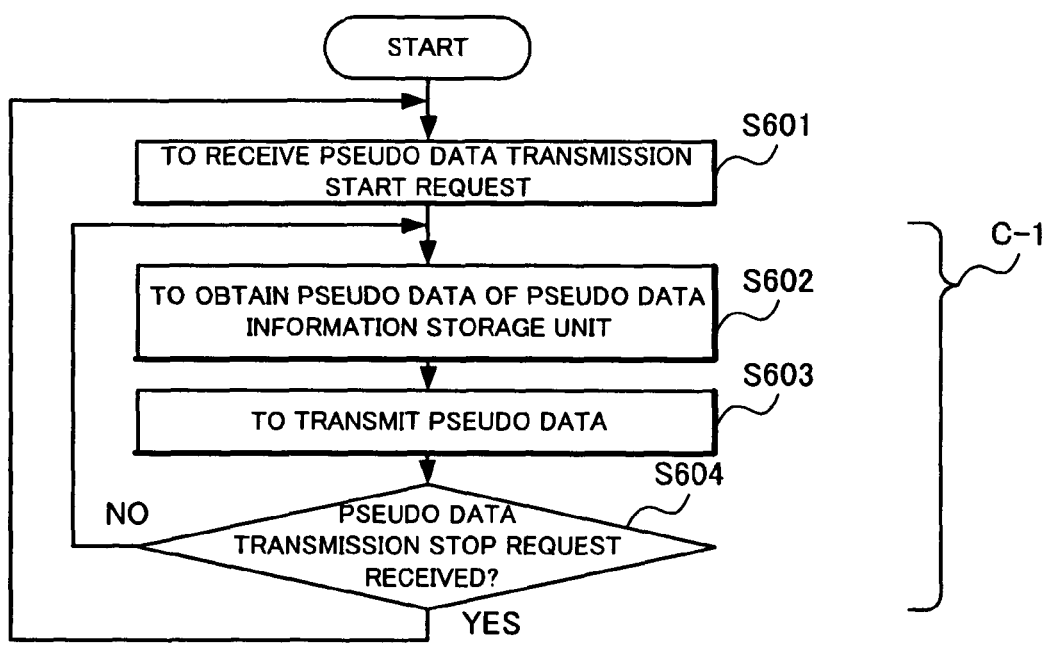
FIG. 6 is a flow chart showing operation of a pseudo data transmission unit according to the first exemplary embodiment.

The processing shown in FIG. 4 through FIG. 6 is realized by shifting the program stored in the storage medium 80 to the main storage unit 302 and executing the same by the CPU 301 that the radio base station 2 has.

First, with reference to FIG. 4, the radio terminal 3 executes data communication with the device on the network 1 through the radio base station 2 (A-1 in FIG. 4). Since communication path set-up is completed as a result of connection negotiation with the radio terminal 3 in response to a connection request from the radio terminal 3, the radio base station 2 is allowed to execute data communication with the radio terminal 3 through the communication path. The radio base station 2 manages assignment information of the radio terminal 3 in connection. In other words, the radio base station 2 manages whether the radio terminal 3 in connection exists under the radio base station 2 itself.

Connection negotiation between the radio base station 2 and the radio terminal 3 may be, for example, IEEE 802.11 connection negotiation, which may be encryption communication using WEP (Wired Equivalent Privacy) or encryption communication using a WEP key dynamically set because connection is allowed as a result of IEEE 802.1X authentication, or may be connection whose security is enhanced using WPA (Wi-Fi Protected Access) or WPA2 (WPA version 2), which may be encryption communication using an encryption algorithm called TKIP (Temporal Key Integrity Protocol) or CCMP (Counter-mode CBC-MAC Protocol) based on AES (Advanced Encryption Standard).

Next, upon detecting no data communication being executed with the radio terminal 3, the radio base station 2 starts count-up by the timer (A-2 in FIG. 4) to determine to start pseudo data transmission at a time point where the timer counts to a held timer value (A-3 in FIG. 4). When data communication with the radio terminal 3 occurs (Step S503 in FIG. 5), the radio base station 2 has its timer counting initialized to zero (Step S504 in FIG. 5).

At this time, the data communication monitoring unit 40 and the pseudo data transmission determination unit 50 of the radio base station 2 operate as follows.

The data communication monitoring unit 40 monitors data transmitted/received through the communication control unit 20, that is, data communication with the radio terminal 3 and notifies the pseudo data transmission determination unit 50 of communication data information related to the monitored communication data.

The pseudo data transmission determination unit 50 seizes data communication conditions based on communication data information notified by the data communication monitoring unit 40. Upon detecting no data communication (A-2 in FIG. 4, Step S501 and Step S502 in FIG. 5), the pseudo data transmission determination unit 50 starts count-up of the timer (elapsed time) (Step S503 in FIG. 5). At a time point where the counting timer reaches the held timer value without thereafter detecting data communication (A-3 in FIG. 4, Step S504 in FIG. 5), the pseudo data transmission determination unit 50 determines to start pseudo data transmission (Step S505 in FIG. 5). After determining to start pseudo data transmission, the pseudo data transmission determination unit 50 instructs the pseudo data transmission unit 60 to start transmission of pseudo data (Step S506 in FIG. 5). Upon detecting data communication (A-1 in FIG. 4 and Step S502 in FIG. 5), the pseudo data transmission determination unit 50 returns to an initial state to initialize the timer (elapsed time) to the value of 0 (Step S501 in FIG. 5).

Next, the radio base station 2 starts transmission of pseudo data (A-3 in FIG. 4). More specifically, upon requesting start of pseudo data transmission (Step S506 in FIG. 5), the pseudo data transmission determination unit 50 of the radio base station 2 enters a state of detecting occurrence of data communication with the radio terminal 3 (Step S507 in FIG. 5).

Next, the radio base station 2 continues transmission of pseudo data until data communication with the radio terminal 3 occurs and at a time point where data communication with the radio terminal 3 occurs, stops the transmission of pseudo data (A-4 in FIG. 4). More specifically, upon detecting occurrence of data communication with the radio terminal 3 (Step S507 in FIG. 5), the pseudo data transmission determination unit 50 of the radio base station 2 determines to stop transmission of pseudo data (Step S508 in FIG. 5) and requests the pseudo data transmission unit 60 to stop transmission of pseudo data (Step S509 in FIG. 5).

Next, the radio terminal 3 executes data communication with a device on the network 1 through the radio base station 2 similarly to the above A-1 in FIG. 4 (A-6 in FIG. 4).

Although illustrated in FIG. 4 is a physical transmission direction of pseudo data, this transmission may have directiveness to be made in a specific direction or may be made scatteredly.

At the above-described start and stop of pseudo data transmission, the pseudo data transmission determination unit 50 and the pseudo data transmission unit 60 of the radio base station 2 operate as follows.

With reference to FIG. 6, upon receiving a pseudo data transmission request from the pseudo data transmission determination unit 50 (Step S601), the pseudo data transmission unit 60 obtains transmission data information stored in the pseudo data information storage unit 70 (Step S602) to transmit pseudo data through the communication control unit 20 (Step S603). Until receiving a request to stop pseudo data transmission from the pseudo data transmission determination unit 50 (Step S604), the pseudo data transmission unit 60 continues acquisition and transmission of pseudo data (C-1 in FIG. 6). Operation may be to obtain pseudo data once at first from the pseudo data information storage unit 70 and thereafter repeatedly transmit pseudo data already obtained without obtaining the same from the unit every time.

Reason for cease of data transmission between the radio terminal 3 and the radio base station 2 may be that data communication ceases because the radio terminal 3 moves to a place where no radio waves reach from the radio base station 2 or that data communication ceases because no data communication is executed although the radio terminal 3 is located within a reach of radio waves from the radio base station 2.

Figure 7:
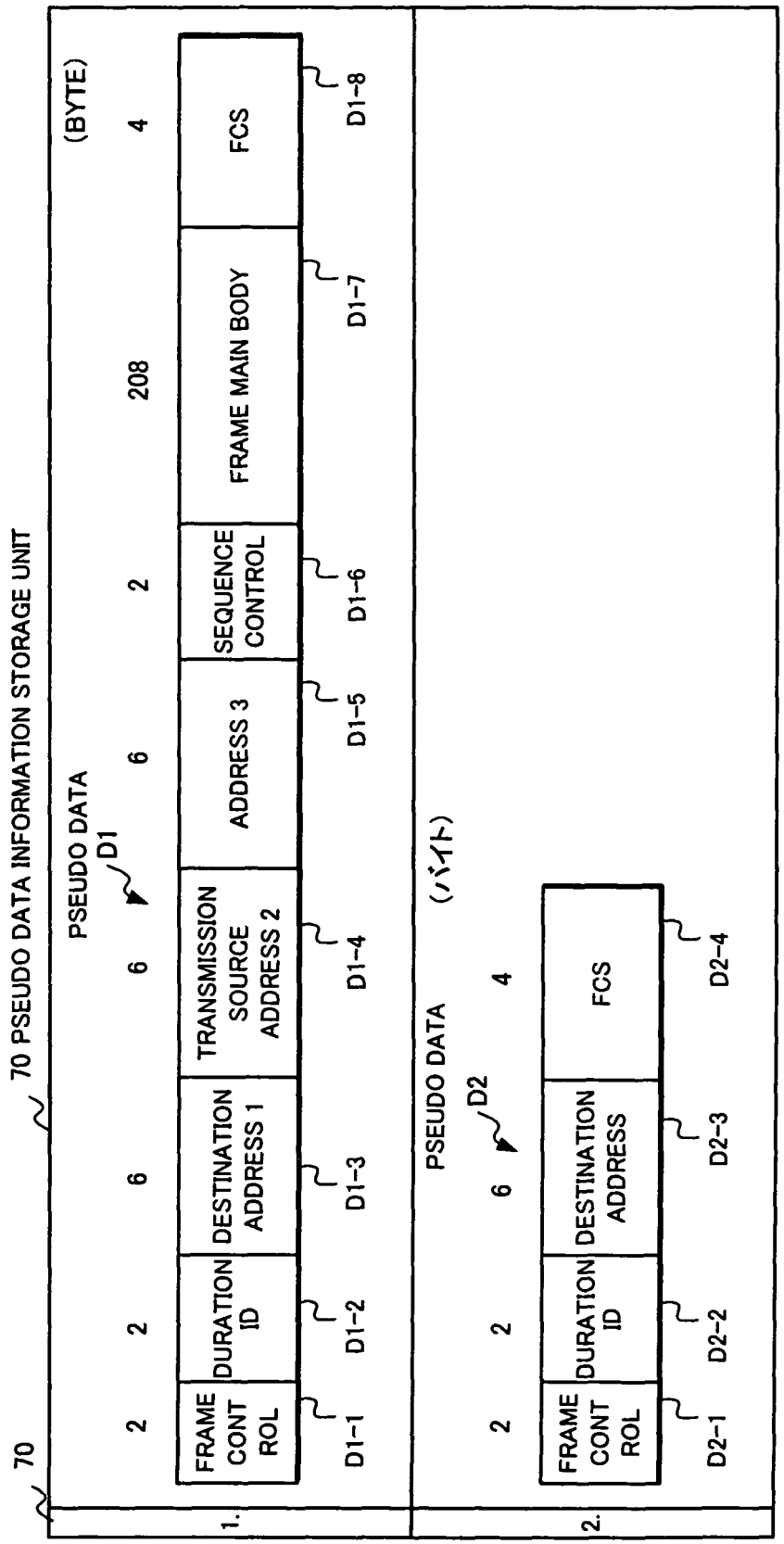
FIG. 7 is a frame structure diagram showing details of a pseudo data frame stored in a pseudo data information storage unit according to the first exemplary embodiment.
Figure 8:
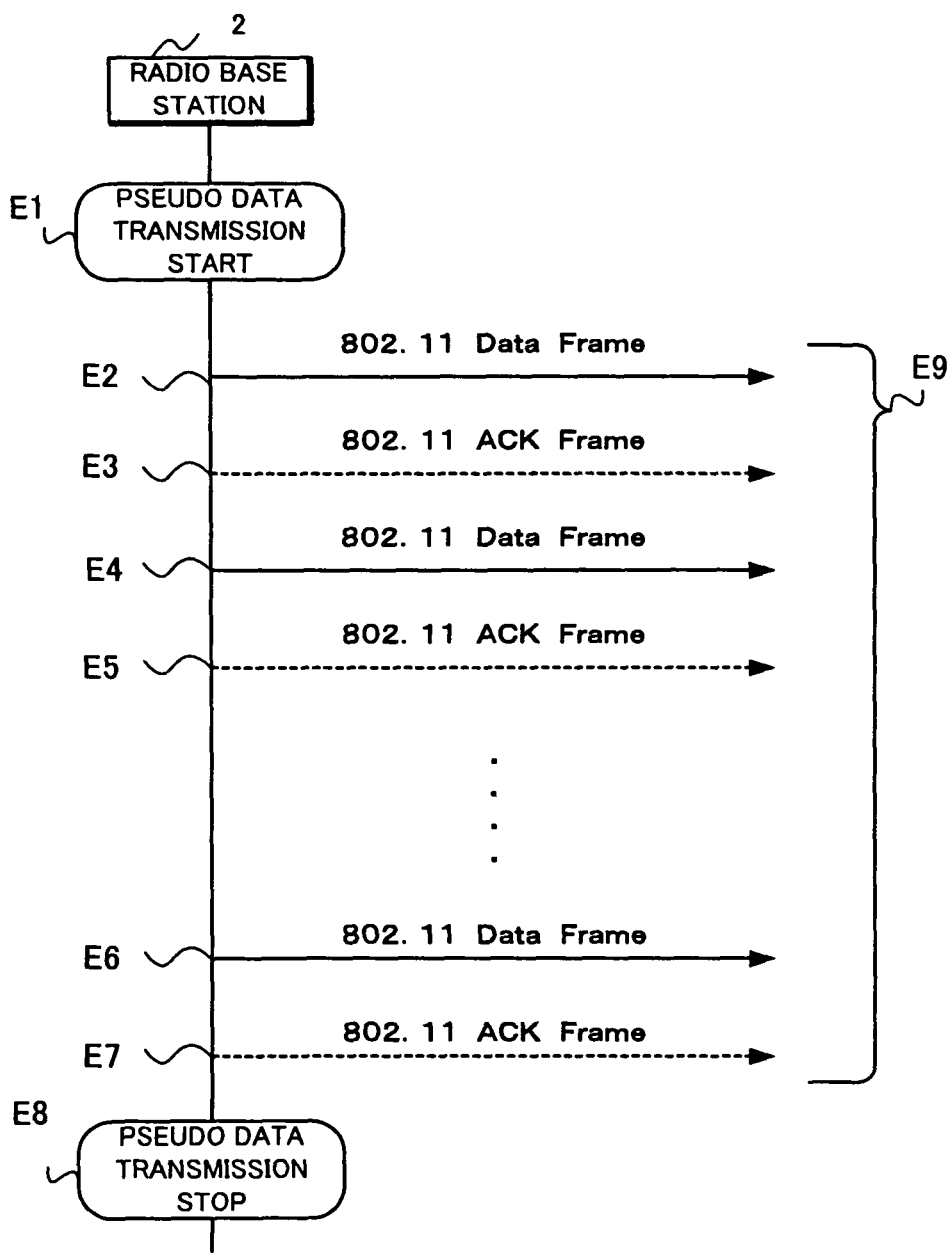
FIG. 8 is a sequence diagram showing details of pseudo data transmitted by the radio base station according to the first exemplary embodiment.

Next, detailed description will be made of pseudo data transmitted by the pseudo data transmission unit 60 of the radio base station 2 with reference to FIG. 7 and FIG. 8. FIG. 7 is a diagram showing an example of pseudo data stored in the pseudo data information storage unit 70 and FIG. 8 is a sequence diagram showing details of pseudo data transmitted by the radio base station 2.

With reference to FIG. 7, in the pseudo data information storage unit 70, two pseudo data D1 and D2 are stored. In this example, the first pseudo data D1, which is an 802.11 data frame, has a MAC address of the radio terminal 3 designated as a destination address 1-D1-3, a MAC address of the radio base station 2 designated as a transmission source address 2-D1-4 and a MAC address of a device on the network 1 designated as an address 3-D1-5 or has a value determined at random included. Each of other fields includes a value appropriate as an 802.11 data frame and a frame main body D1-7 includes data of a specific size. Contents of data may be a protocol mounted for realizing an application such as voice call or video reception or may be a random value.

As another example of the pseudo data D1, a MAC address of the radio base station 2 may be designated as the destination address 1-D1-3 and a MAC address of the radio terminal 3 may be designated as the transmission source address 2-D1-4.

The second pseudo data D2 is an 802.11 ACK frame, which is a response frame to the pseudo data D1 and whose destination address D2-3 includes a MAC address of the radio base station 2. Each of the other fields includes a value appropriate as an 802.11 ACK frame.

As another example of the pseudo data D2, a MAC address of the radio terminal 3 may be designated as the destination address 1-D1-3 and a MAC address of the radio terminal 3 may be designated as the transmission source address 2-D1-4.

With reference to FIG. 8, illustrated is how the radio base station 2 transmits pseudo data by using the pseudo data D1 and D2 shown in FIG. 7. When starting transmission of pseudo data in a manner as described above (E1 in FIG. 8), the radio base station 2 obtains pseudo data stored in the pseudo data information storage unit 70 and when there are a plurality of pieces of data, transmits all sequentially (E2, E3 in FIG. 8). Until receiving a request to stop pseudo data transmission, the radio base station 2 thereafter successively continues operation of obtaining pseudo data stored in the pseudo data information storage unit 70 and transmitting the same similarly (E4 through E7 in FIG. 8). When the pseudo data transmission unit 60 receives a request to stop pseudo data transmission from the pseudo data transmission determination unit 50, the radio base station 2 stops the pseudo data transmission (E8 in FIG. 8).

Effects of First Exemplary Embodiment

Next, effects of the present exemplary embodiment will be described.

Since in the present exemplary embodiment, the radio base station 2 is structured to transmit pseudo data which is obtained by virtualizing data communication made with the radio terminal 3 according to conditions of communication with the radio terminal 3, even when there occurs no actual data communication between the radio base station 2 and the radio terminal 3, virtual data communication can be generated between the radio base station 2 and the radio terminal 3. Therefore, it is possible to make it difficult to specify actual data communication conditions between the radio base station 2 and the radio terminal 3 and to make it difficult to specify existence of the radio terminal 3 as well.

In addition, since in the present exemplary embodiment, the radio base station 2 is structured to have a plurality of pieces of pseudo data to be transmitted stored and sequentially transmit the same, sequential transmission of data frames of different forms is possible. Therefore, the radio base station 2 is allowed to transmit not only data to be transmitted by the radio base station 2 but also pseudo data obtained by virtualizing data to be transmitted by the radio terminal 3 as a communication partner. Accordingly, by virtualizing data from the radio base station 2 to the radio terminal 3 and data from the radio terminal 3 to the radio base station 2, the radio base station 2 is allowed to virtualize data communication in both directions, thereby making it more difficult to specify actual data communication.

Kinds of pseudo data stored in the pseudo data information storage unit 70 according to the present exemplary embodiment includes, in addition to an 802.11 data frame and an 802.11 ACK frame as a response thereto, an 802.11 control frame other than the 802.11 ACK frame, an 802.11 management frame such as an 802.11 Authentication frame or an 802.11 Association frame used for connection negotiation, and other than these, various kinds of pseudo data can be stored. This makes it possible to virtualize not only data communication conditions but also assignment conditions of the radio terminal 3, thereby enabling existence of the radio terminal 3 to be unclear.

In addition, as a size of a data part of the pseudo data stored in the pseudo data information storage unit 70 according to the present exemplary embodiment, any value can be set within a range of a transmittable data size through the radio communication interface unit 30. When virtualizing data communication of the radio terminal 3 which executes voice call through the radio base station 2, for example, designating, as a size of the data part, a packet size based on voice codec used in voice call and a size with a necessary header added such as UDP (User Datagram Protocol) and RTP (Real-time Transport Protocol) enables a pseudo data frame not so different from an actual data communication frame to be generated. In a data part of pseudo data stored in the pseudo data information storage unit 70, for example, assume that the frame main body D1-7 is virtualization of a voice call application and has an LLC (Logical Link Control) header, an IP header, a UDP header, an RTP header and a voice payload of G.711 A-law (interval of 20 msec.), the sizes are 8 bytes, 20 bytes, 8 bytes, 12 bytes and 160 bytes, respectively, to have a size of a total of 208 bytes. Also in a case of a structure according to other protocol, the same effect can be obtained by designating the same size as that of a structure based on the protocol. At this time, as to data itself of the data frame main body, only size needs to be matched and it may have a random value.

Second Exemplary Embodiment

Next, a second exemplary embodiment of the present invention will be described in detail with reference to the drawings.

Structure of Second Exemplary Embodiment

Figure 9:
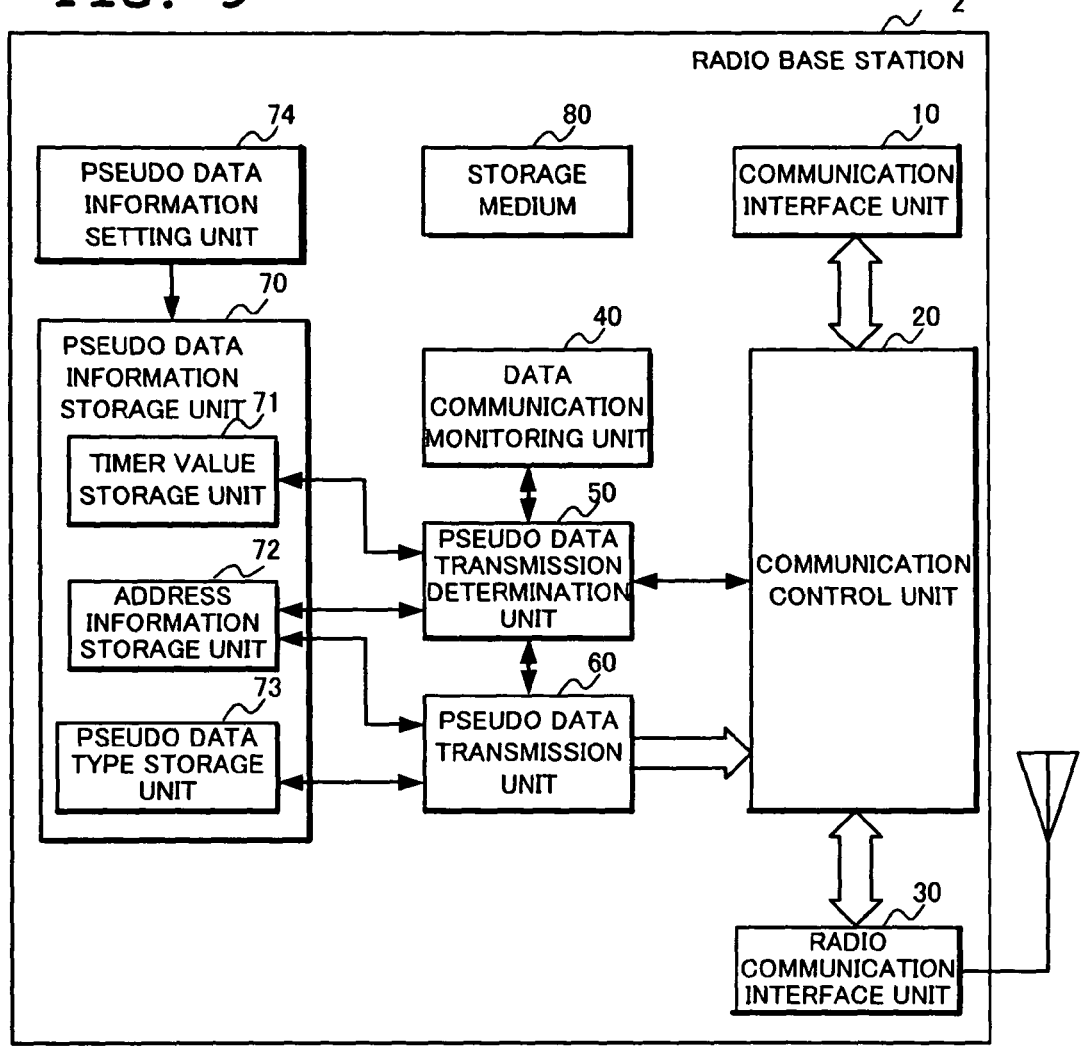
FIG. 9 is a block diagram showing a structure of a radio base station according to a second exemplary embodiment.

FIG. 9 is a block diagram showing a structure of the radio base station 2 of a radio communication system according to the second exemplary embodiment of the present invention.

With reference to FIG. 9, the present exemplary embodiment differs in that the radio base station 2 according to the present exemplary embodiment comprises, in addition to the components of the radio base station 2 according to the first exemplary embodiment shown in FIG. 2, a pseudo data information setting unit 74 having a function of setting information related to pseudo data at the pseudo data information storage unit 70, and in that the pseudo data information storage unit 70 according to the present exemplary embodiment comprises, unlike the pseudo data information storage unit 70 according to the first exemplary embodiment shown in FIG. 2, a timer value storage unit 71 for storing a timer value, an address information storage unit 72 for storing information related to an address in pseudo data, and a pseudo data type storage unit 73 for storing information related to a kind of data in pseudo data.

Figure 10:
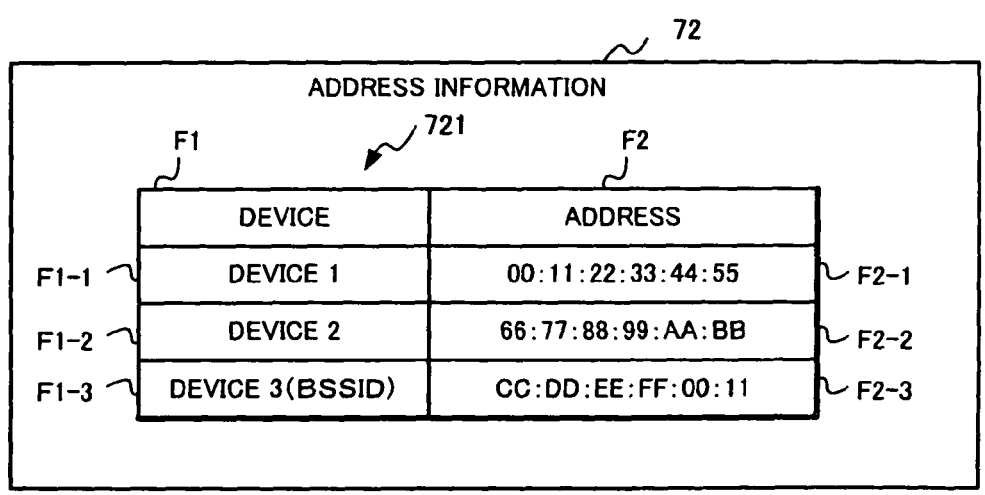
FIG. 10 is a diagram showing a further detailed structure of an address information storage unit according to the second exemplary embodiment.

With reference to FIG. 10, according to the present exemplary embodiment, the address information storage unit 72 stores address information 721 formed of a device F1 and an address F2 and has, as a MAC address of a device which is virtualized to be in data communication, three addresses including an address F2-1 and an address F2-2 of two devices, a device 1 (device F1-1) and a device 2 (device F1-2) assumed to be two parties between which data communication is executed, and an address F2-3 of a device 3 (device F1-3) assumed to be the radio base station 2.

With reference to FIG. 11, the pseudo data type storage unit 73 stores a pseudo data type 731 comprising a data frame type G2 indicative of a type of data frame of pseudo data, a data size G3 indicative of a size of a data part in a data frame type including the data part, a data transmission direction G4 indicative of a data transmission direction and a transmission order G1.

Operation of these units differs in part from the operation of the units of the radio base station 2 according to the first exemplary embodiment in the following points.

The data communication monitoring unit 40 comprises, in addition to the operation of the data communication monitoring unit 40 according to the first exemplary embodiment shown in FIG. 2, a function of executing filtering based on a condition designated by the pseudo data transmission determination unit 50 and a function of notifying the pseudo data transmission determination unit 50 of only a filtering result. Used as a filtering condition is at least one of a destination address, a transmission source address, a protocol kind, a packet kind and the like. An address may be an IP address or a MAC address. Other various filtering conditions can be used.

The pseudo data transmission determination unit 50 comprises, in addition to the operation of the pseudo data transmission determination unit 50 according to the first exemplary embodiment shown in FIG. 2, a function of setting a filtering condition for providing the data communication monitoring unit 40 with communication data information only when a specific condition is satisfied. Used as a settable filtering condition is at least one of a destination address, a transmission source address, a protocol kind, and a packet kind. An address may be an IP address or a MAC address. Function may be provided enabling other various filtering conditions to be set.

The data communication monitoring unit 40 and the pseudo data transmission determination unit 50 are allowed to obtain these filtering conditions from the address information storage unit 72.

In addition, the pseudo data transmission determination unit 50 is allowed to obtain, from the timer value storage unit 71, a timer value as a waiting time until determining pseudo data transmission start after the communication data information notified from the data communication monitoring unit 40 ceases. Possible method is, with a range of numerical values set as a timer value, random selection from the range of numerical values by the pseudo data transmission determination unit 50 each time. When the timer value is set to range from 10 minutes to one hour, for example, random selection may be made from the range each time by the pseudo data transmission determination unit 50. In this case, no limitation is given to a range of settable timer values as a range.

Although the pseudo data transmission unit 60 is the same in operation as the pseudo data transmission unit 60 according to the first exemplary embodiment shown in FIG. 2 with respect to the function of starting pseudo data transmission according to a request from the pseudo data transmission determination unit 50 for starting pseudo data transmission and stopping pseudo data transmission according to a request for stopping pseudo data transmission, it differs in a pseudo data generation procedure with respect to the following points.

The pseudo data transmission unit 60 comprises a function of generating pseudo data based on the data frame type G2 of pseudo data stored in the pseudo data type storage unit 73 of the pseudo data information storage unit 70. In other words, the pseudo data transmission unit 60 comprehends a structure of a data frame for the data frame type G2 and generates a pseudo data frame based on a data frame type of the pseudo data type storage unit 73. When a data part of a data frame is required in generating a pseudo data frame, the pseudo data transmission unit 60 generates a pseudo data frame based on a size recited in the data size G3. As to an address part of a pseudo data frame, the pseudo data transmission unit 60 obtains the address information 721 of a device in question from the address information storage unit 72 to generate an address part of the pseudo data frame based on the data transmission direction G4.

Operation of the pseudo data transmission unit 60 is the same as that of the pseudo data transmission unit 60 according to the first exemplary embodiment shown in FIG. 2, which is to generate and transmit a pseudo data frame in an order recited in the pseudo data type storage unit 73 and successively repeat transmission starting with a first pseudo data when all is transmitted.

The timer value storage unit 71 stores various kinds of timer values. The timer value storage unit 71 may store these timer values in advance or have them set by the pseudo data information setting unit 74. The timer value storage unit 71 has a timer value for use in determining pseudo data transmission start at the pseudo data transmission determination unit 50, which timer value is read by the pseudo data transmission determination unit 50. The timer value may be, for example, 10 minutes or 30 minutes or one hour or two hours, to which no limitation is given as a settable timer value in particular. In addition, the timer value storage unit 71 is allowed to have a possible range of a timer value and store a range from 10 minutes to 30 minutes, for example.

As described above, with reference to FIG. 10, the address information storage unit 72 stores the address information 721 formed of the device F1 and the address F2 and has three addresses as a MAC address of a device which is virtualized to have data communication, the address F2-1 and the address F2-2 of the two devices 1 (device F1-1) and 2 (device F1-2) assumed to be the two which execute data communication, and the address F2-3 of the device 3 (device F1-3) assumed to be the radio base station 2. In other words, the address information storage unit 72 has an address of true data to be transmitted and received between the device F1-1 and the device F1-2 for generating pseudo data.

The address F2-1 of the device 1 and the address F2-2 of the device 2 indicate MAC addresses of the two devices assumed to execute data communication and the address F2-3 of the device 3 indicates BSSID (Basic Service Set Identifier), that is, a MAC address of the radio base station 2. When assuming communication in an ad hoc mode, the address F3-2 of the device 3 is not always the MAC address of the radio base station 2. When assuming data communication between the radio base station 2 and the radio terminal 3, either the address F2-1 of the device 1 or the address F2-2 of the device 2 and the address F2-3 of the device 3 become the same. The address information 721 stored in the address information storage unit 72 is read by the pseudo data transmission determination unit 50 and the pseudo data transmission unit 60.

As described with reference to FIG. 11, the pseudo data type storage unit 73 stores the pseudo data type 731 comprising the data frame type G2 indicative of a type of pseudo data frame, the data size G3 indicative of a size of a data part in a data frame type including the data part, the data transmission direction G4 indicative of a data transmission direction and the transmission order G1. The pseudo data type 731 stored in the pseudo data type storage unit 73 is read by the pseudo data transmission unit 60.

The data frame type G2 stores a type of data frame to be made into a pseudo data frame, on which type, the pseudo data transmission unit 60 forms a data frame. The data frame type G2 includes each sub-type, for example, an 802.11 data frame, an 802.11 management frame, an 802.11 control frame and an 802.11 ACK frame. As the data frame type G2, other types than those can be defined.

The data size G3 is a numerical value indicating, when the data frame type G2 is a data frame type including a data part, data of which size is included in a data part of a pseudo data frame.

The data transmission direction G4 indicates a data frame from which direction the pseudo data frame in the present item derives. The data transmission direction G4 indicates, for example, whether it is a pseudo data frame from the device 1 to the device 2 of the address information storage unit 72 or a pseudo data frame from the device 2 to the device 1. The pseudo data frames are described as G1, 2, 3, 4 in the order of transmission by the pseudo data transmission unit 60.

The pseudo data information setting unit 74 has a function of setting information stored in the pseudo data information storage unit 70, that is, the timer value storage unit 71, the address information storage unit 72 and the pseudo data type storage unit 73. The pseudo data information setting unit 74 is structured to have a user interface and may be structured to have a GUI (Graphical User Interface) to which a user is allowed to input.

The radio base station 2 realizes the above-described processing of each unit by shifting the program stored in the recording medium 80 to the main storage unit 302 and executing the same by the CPU 301.

Operation of Second Exemplary Embodiment

Next, operation of the entire radio communication system according to the present exemplary embodiment will be described mainly with respect to a difference from the operation of the first exemplary embodiment of the present invention.

The processing shown in the present exemplary embodiment, similarly to the first exemplary embodiment, can be realized by shifting the program stored in the storage medium 80 to the main storage unit 302 and executing the same by the CPU 301 that the radio base station 2 has.

The data communication monitoring unit 40 differs from the first exemplary embodiment in operation of notifying the pseudo data transmission determination unit 50 of only a filtering result based on a filtering condition designated by the pseudo data transmission determination unit 50. When a condition is designated by the pseudo data transmission determination unit 50 to notify the pseudo data transmission determination unit 50 of only communication related to a specific MAC address, for example, the data communication monitoring unit 40 according to the present exemplary embodiment is allowed to notify the pseudo data transmission determination unit 50 of only communication related to a specific MAC address.

The pseudo data transmission determination unit 50 is allowed to receive a notification of only information for data communication related to a relevant address by obtaining the address information 721 recited in the address information storage unit 72 and designating a filtering condition to the data communication monitoring unit 40. It is possible to designate only the device 1 or only the device 2 or both of them. The address information storage unit 72 may comprise, in addition to the address information F2-1 and F2-2 for the devices, information (flag) for determining whether the device is a target of pseudo data frame transmission.

In this case, the pseudo data transmission determination unit 50 is allowed to determine whether the device is to be a target of pseudo data frame transmission based on the flag. The pseudo data transmission determination unit 50 makes a request, according to a timer value of the timer value storage unit 71, to the pseudo data transmission unit 60 to start transmission of pseudo data at a time point where the count exceeds the timer value after data communication ceases and makes a request to stop transmission of pseudo data at a time point where data communication occurrence is detected. The pseudo data transmission determination unit 50 is also enabled to determine not to transmit pseudo data when none of information related to a device such as the address information 721 is stored in the address information storage unit 72.

Upon receiving a request to start pseudo data transmission from the pseudo data transmission determination unit 50, the pseudo data transmission unit 60 obtains information related to the data frame type G2, the data size G3 as required, and the data transmission direction G4 and the transmission order G1 related to pseudo data from the pseudo data type storage unit 73 and further combines them with the address information 721 of an assumed device which is obtained from the address information storage unit 72 to generate a pseudo data frame. When a plurality of pieces of pseudo data frame information (pseudo data type 731) is stored in the pseudo data type storage unit 73, the pseudo data transmission unit 60 generates pseudo data frames of all the information and transmits the generated pseudo data frames through the communication control unit 20 based on the transmission order G1. When finishing transmitting all the pseudo data frames, the pseudo data transmission unit 60 again repeats the operation of transmitting a pseudo data frame from the beginning. In addition, the pseudo data transmission unit 60 continuously transmits a pseudo data frame until a request to stop pseudo data transmission is made from the pseudo data transmission determination unit 50.

The present exemplary embodiment can be combined with the above-described first exemplary embodiment.

Effects of Second Exemplary Embodiment

Next, effects of the present exemplary embodiment will be described.

Since the present exemplary embodiment is structured to store information related to a device as a target of a pseudo data frame, it is possible to monitor only a data communication condition related to a device as a target. In other words, the present exemplary embodiment enables discrimination of communication data of the radio device 3 which executes target communication when copying communication data based on the address information 721 stored in the address information storage unit 72. Therefore, the radio device 3 to be a target to which pseudo data is transmitted can be specified at the radio base station 2, and even when data communication exists with the radio device 3 not to be a target, transmission of a pseudo data frame is possible supposing the radio device 3 as a target.

In addition, according to the present embodiment, since the radio base station 2 is structured to generate and transmit a pseudo data frame by designating the data frame type G2, the data size G3, the data transmission direction G4 and the like as the information related to pseudo data to be transmitted and structured to separately store address information for an assumed device so as to be correlated with the data transmission direction G4, it is unnecessary to generate all pseudo data and then store the same and possible to describe the address information 721 at one place in the lump in the address information storage unit 72.

Therefore, the present embodiment enables the data frame type G2 of a pseudo data frame to be designated without requiring more labor than required in the first exemplary embodiment, and because pseudo data is generated based on the address information 721 stored in the address information storage unit 72 and the pseudo data type 731 stored in the pseudo data type storage unit 73, it is possible with ease to change to set an address of a device as a target to be a different value and prevent a description error of a pseudo data frame forming the pseudo data.

Furthermore, since the present exemplary embodiment is structured to have the pseudo data information setting unit 74, information can be stored in the pseudo data information storage unit 70. When the pseudo data information setting unit 74 is a user interface, for example, user input can be accepted. Furthermore, when the pseudo data information setting unit 74 is a graphical user interface, a user is also allowed to input while visually confirming the input. As to input of the data frame type G2, for example, displaying the data frame type G2 registered in advance to a user in a pull-down form through a display enables the user to select the data frame type G2 with ease and select also other data size G3, data transmission direction G4 and the like by the same manner. Having a check box for selecting execution/non-execution of transmission of pseudo data also enables pseudo data transmission at the radio base station 2 to be controlled. In addition, the pseudo data information setting unit 74 may be structured to have a function of a WEB server to store setting obtained in response to a request from other communication terminal through a WEB access into the pseudo data information storage unit 70.

This enables transmission contents of pseudo data to be set with ease through the user interface and also enables them to be changed with ease. Even when the radio base station 2 fails to have an external display device such as a display, a display that an external communication terminal has allows a user to input through a graphical user interface.

Third Exemplary Embodiment

Next, a third exemplary embodiment of the present invention will be described in detail with reference to the drawings.

FIG. 12 is a diagram showing arrangement of information stored in the pseudo data type storage unit 73 according to the present exemplary embodiment.

With reference to FIG. 12, the pseudo data type storage unit 73 according to the present exemplary embodiment differs from the pseudo data type storage unit 73 according to the second exemplary embodiment shown in FIG. 10 in storing application information 732 formed of an application type H2 indicating based on which application function, a data frame to be transmitted is assumed at the time of pseudo data frame generation, an ON/OFF flag H3 indicative of execution/non-execution to the application type H2, and a number H1 for discriminating a correspondence to the application type H2.

With reference to FIG. 9, although the pseudo data transmission unit 60 is the same in operation as the pseudo data transmission unit 60 according to the second exemplary embodiment with respect to the function of starting pseudo data transmission in response to a request from the pseudo data transmission determination unit 50 to start pseudo data transmission and stopping pseudo data transmission in response to a request to stop pseudo data transmission, it differs in a pseudo data generation procedure in the following points, so that description will be mainly made with respect to different points in the following.

The pseudo data transmission unit 60 comprises a function of generating pseudo data based on the application information 732 of pseudo data stored in the pseudo data type storage unit 73. The pseudo data transmission unit 60 comprises a series of a data frame structure and a data size, and a data transmission interval between the respective data frames and a data transmission and reception direction corresponding to the application H2 and generates a series of pseudo data frames based on the application type H2 in the pseudo data type storage unit 73. In other words, the present exemplary embodiment is structured to comprehend which data frame is formed in which order based on the application type H2, a data size assuming a protocol included in a data frame main body of each data frame, and a data transmission direction and a transmission interval of each data frame. With information for generating the series of data frames and information indicative of a data frame transmission interval or the like in the pseudo data transmission unit 60 stored in the pseudo data information storage unit 70, the pseudo data transmission unit 60 may be structured to generate the application type H2 based series of pseudo data frames based on the information stored in the pseudo data information storage unit 70. This indicates that the operation according to the present exemplary embodiment can be converged into a series of structures of data frames recited in the pseudo data type storage unit 73 according to the second exemplary embodiment shown in FIG. 10 based on the application type H2. Operation to follow of the present exemplary embodiment for generating a pseudo data frame from the state shown in FIG. 10 is the same as the operation of the second exemplary embodiment. Operation of obtaining the address information 721 of an assumed device according to the present exemplary embodiment is the same as the operation of the second exemplary embodiment.

Furthermore, the pseudo data transmission unit 60 comprehends in advance an appropriate data communication continuous period (period in which data communication is continued) corresponding to each application type H2 and when the application type H2 is a voice call application, for example, it comprehends that the data communication continuous period is five minutes, ten minutes, thirty minutes, one hour or the like. This value may be formed of a specific time or may be stored as a range such as from five minutes to one hour by the pseudo data transmission unit 60. With an appropriate data communication continuous period corresponding to each application type H2 stored in the timer value storage unit 71, the pseudo data transmission unit 60 may be structured to read a data communication continuous period from the timer value storage unit 71.

Similarly to the first exemplary embodiment, the processing shown in the present exemplary embodiment can be realized by shifting the program stored in the storage medium 80 to the main storage unit 302 and executing the same by the CPU 301 that the radio base station 2 has.

Upon receiving a request from the pseudo data transmission determination unit 50 to start transmission of pseudo data, the pseudo data transmission unit 60 selects at random one from the application types H2 whose ON/OFF flag H3 stored in the pseudo data type storage unit 73 is ON. When voice call is selected, for example, the pseudo data transmission unit 60 generates a series of pseudo data frames assuming voice call to start transmission of a pseudo data frame as described above. At this time, the pseudo data transmission unit 60 transmits a pseudo data frame only during the above-described data communication continuous period corresponding to each application type H2. When the data communication continuous period is stored as a range, the pseudo data transmission unit 60 selects a data communication continuous period at random from the ranges. In a case, for example, where the data communication continuous period is set to be in the range from five minutes to one hour for a voice call application, assume that the pseudo data transmission unit 60 selects 30 minutes as a data communication continuous period by itself. Then, the pseudo data transmission unit 60 will transmit a pseudo data frame for thirty minutes unless a request for stopping pseudo data transmission is received halfway.

When finishing transmission of a series of pseudo data based on the selected data communication continuous period for the application type H2, the pseudo data transmission unit 60 executes operation of waiting for a random time. This time may be five minutes or ten minutes or thirty minutes and has no limitation in particular. When completing the operation of waiting for the random time selected by the pseudo data transmission determination unit 50, the pseudo data transmission unit 60 again executes the operation of selecting at random one application type H2 from the application types H2 whose ON/OFF flag H3 stored in the application information 732 recited in the pseudo data type storage unit 73 is ON. In this case, internet TV (H2-2) may be selected next from among the application types H2. Operation to follow will be operation of repeating the above-described operation.

As a result, the pseudo data transmission unit 60 continuously executes operation of conducting data communication virtualizing data communication made by the execution of a certain application for a fixed time period and then executing nothing for a certain time period and at a further lapse of a fixed time, executing data communication virtualizing data communication made by the execution of a certain application for a fixed time period. In other words, in the present exemplary embodiment, under a condition where several pieces of information related to an application assumed in advance are stored in the pseudo data type storage unit 73, pseudo data corresponding to an application selected at random is transmitted and when a series of data transmission is completed, transmission of a series of pseudo data corresponding to an application again selected at random is repeated.

The present exemplary embodiment can be combined with either the above-described first or second exemplary embodiment or both of them.

Effects of Third Exemplary Embodiment

Next, effects of the present exemplary embodiment will be described.

The present exemplary embodiment is structured to generate and transmit a series of pseudo data frames by designating only the application type H2 as information related to pseudo data to be transmitted at the radio base station 2 and select an appropriate data communication continuous period for each application type H2. Therefore, the effect can be attained of easiness to understand which is realized by designating the application type H2 and easiness to set as compared with the second exemplary embodiment, as well as the effect of making it difficult to specify actual data communication because it is difficult to distinguish actual data communication and pseudo data communication.

In addition, since the present exemplary embodiment is structured to designate only the application type H2 as information related to pseudo data to be transmitted at the radio base station 2, validity/invalidity of a plurality of application types H2 can be selected with ease. It is also structured to resume transmission of pseudo data after continuously stopping transmission of pseudo data for a random time period after a data communication continuous period appropriate for each application type H2 ends. Therefore, by at random selecting one from the application types H2 as targets for virtualization, continuous transmission of a pseudo data frame assuming a certain specific application can be avoided, and further difficulty of distinguishing actual data communication and pseudo data communication realized by setting a period in which no pseudo data is transmitted makes it difficult to specify actual data communication.

Furthermore, the pseudo data transmission unit 60 is allowed to select an application candidate assuming pseudo data frame generation and select one to be executed according to a pair of addresses designated in response to a request for starting pseudo data transmission from the pseudo data transmission determination unit 50. As a result, even when there exist a plurality of pairs of addresses designated by the pseudo data transmission determination unit 50, the pseudo data transmission unit 60 is allowed to select an appropriate application from among application candidates which can assume transmission of a different piece of pseudo data for each address pair.

In addition, since the pseudo data transmission unit 60 is allowed to select an application candidate assuming pseudo data frame generation and select one to be executed, a pseudo data frame for communicating pseudo data can be generated flexibly.

Fourth Exemplary Embodiment

Next, a fourth exemplary embodiment of the present invention will be described in detail with reference to the drawings.

Figure 13:
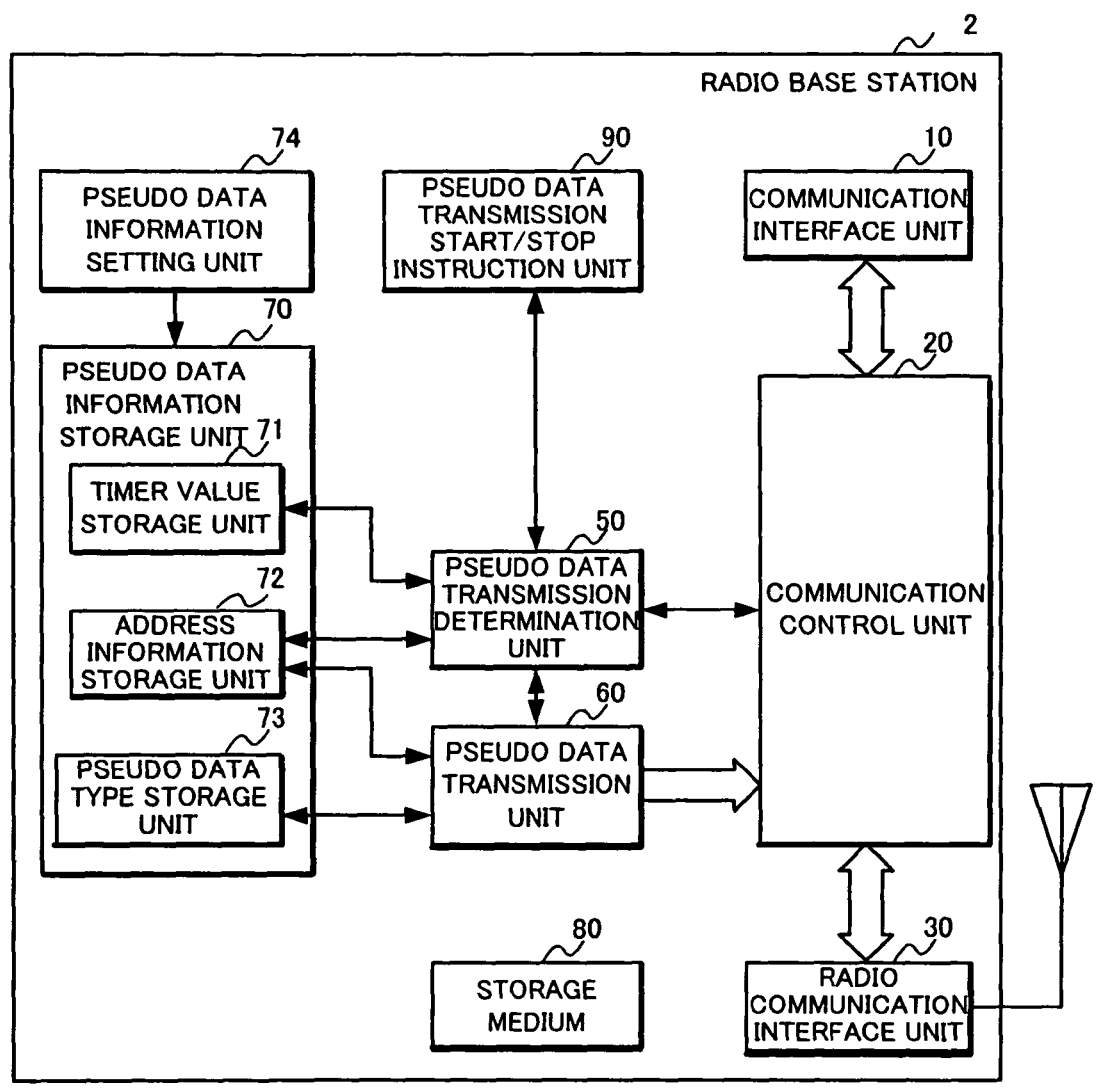
FIG. 13 is a block diagram showing a structure of a radio base station according to a fourth exemplary embodiment of the present invention.

FIG. 13 is a block diagram showing a structure of the radio base station 2 according to the present exemplary embodiment.

With reference to FIG. 13, the radio base station 2 according to the present exemplary embodiment differs from the above-described first to third exemplary embodiments in having a pseudo data transmission start/stop instruction unit 90 for instructing the pseudo data transmission determination unit 60 on timing to start pseudo data transmission and timing to stop pseudo data transmission in addition to the components of the radio base station 2 according to the first exemplary embodiment shown in FIG. 2 and the radio base station 2 according to the second exemplary embodiment shown in FIG. 9 and the third exemplary embodiment. In the following, description will be made mainly with respect to points different from the above-described first to third exemplary embodiments.

The processing shown in the present exemplary embodiment, similarly to the first exemplary embodiment, can be realized by shifting the program stored in the storage medium 80 to the main storage unit 302 and executing the same by the CPU 301 that the radio base station 2 has.

Although the pseudo data transmission determination units 50 according to the above-described first to third exemplary embodiments determine to start or stop pseudo data transmission based on the information from the data communication monitoring unit 40, the pseudo data transmission determination unit 50 according to the present exemplary embodiment determines to start or stop pseudo data transmission based on a start instruction and a stop instruction from the pseudo data transmission start/stop instruction unit 90 and upon receiving the start instruction, requests the pseudo data transmission unit 60 to start pseudo data transmission, and as required notifies the pseudo data transmission unit 60 of an address obtained from the address information storage unit 72 as an address to be started together with the request. The pseudo data transmission determination unit 50 according to the present exemplary embodiment also requests the pseudo data transmission unit 60 to stop pseudo data transmission upon receiving a stop instruction and as required notifies the pseudo data transmission unit 60 of an address obtained from the address information storage unit 72 as an address to be stopped together with the request.

The pseudo data transmission start/stop instruction unit 90 has a function of instructing the pseudo data transmission determination unit 50 to start transmission of pseudo data and a function of instructing to stop transmission of pseudo data. The pseudo data transmission start/stop instruction unit 90 may be formed of a user interface and in this case, pseudo data transmission start and pseudo data transmission stop can be realized by timing designated by a user of the radio base station 2. The pseudo data transmission start/stop instruction unit 90 may be formed also of a graphical user interface and in this case, a user of the radio base station 2 is allowed to start and stop pseudo data transmission while executing visual confirmation.

Furthermore, by notifying the pseudo data transmission start/stop instruction unit 90 of the application information assumed to be a pseudo data frame being in transmission or the like through the pseudo data transmission determination unit 50 by the pseudo data transmission unit 60, it is possible to present a user of the radio base station 2, for example, whether a transmission mode of pseudo data is being executed or not and when in execution, which application is assumed for pseudo data in transmission. The pseudo data transmission start/stop instruction unit 90 also may have a function of a WEB server to store setting obtained upon receiving a request through a WEB access from other communication terminal into the pseudo data information storage unit 70.

The present exemplary embodiment can be combined with any or all of the above-described first to third exemplary embodiments.

Effects of Fourth Exemplary Embodiment

Next, effects of the present exemplary embodiment will be described.

Since the present exemplary embodiment is structured to have an interface provided which enables instruction to start and stop pseudo data transmission, pseudo data transmission can be started at any timing and pseudo data transmission can be stopped at any timing. Therefore, in a case where pseudo data transmission start and stop is correlated with a button formed as hardware that a radio device has or a virtual button formed as software, it is structured to switch between being in pseudo data transmission mode execution and in pseudo data transmission mode stopping every time the button is pressed. As a result, the device is structured to be easy to understand for a user of the radio base station 2 which is realized by pressing a button, resulting in enabling use of the pseudo data transmission function.

Fifth Exemplary Embodiment

Next, a fifth exemplary embodiment of the present invention will be described in detail with reference to the drawings.

Figure 14:
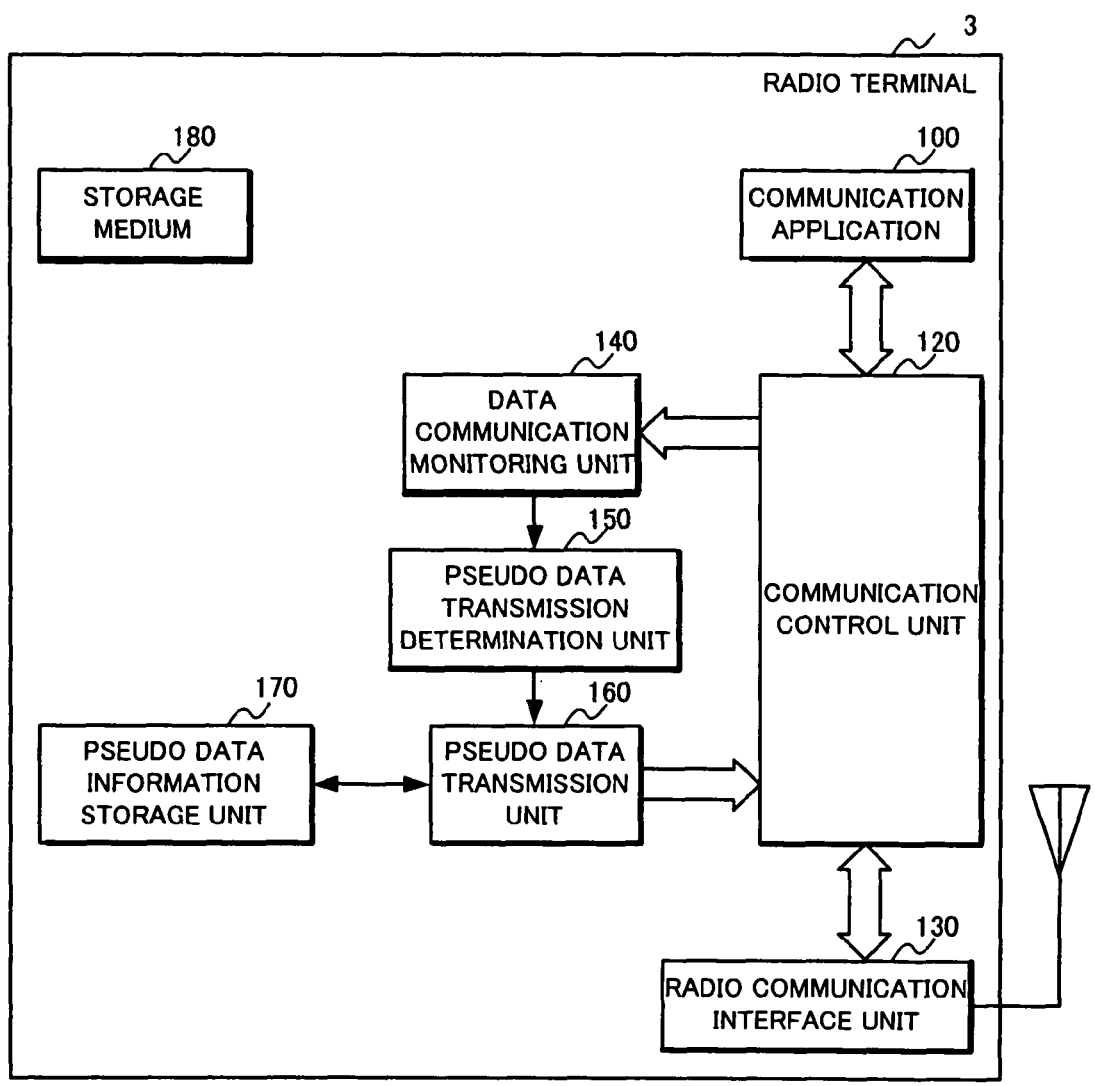
FIG. 14 is a block diagram showing a structure of a radio terminal according to a fifth exemplary embodiment of the present invention.

FIG. 14 is a block diagram showing a structure of the radio terminal 3 according to the present exemplary embodiment.

In FIG. 14, the radio terminal 3 comprises a communication application 100 for executing data communication through a radio communication interface unit 130, a communication control unit 120 which executes communication path management and data transmission/reception instruction to/from the radio base station 2 through the radio communication interface unit 130 and data relay between the communication application 100 and the radio communication interface unit 130, the radio communication interface unit 130 in charge of data transmission and reception through a radio medium, a data communication monitoring unit 140 which obtains, through the communication control unit 120, data communication through the radio communication interface unit 130, a pseudo data transmission determination unit 150 which determines whether to start or stop pseudo data transmission based on a data communication condition obtained by the data communication monitoring unit 140, a pseudo data transmission unit 160 which generates pseudo data based on information of a pseudo data information storage unit 170 in response to an instruction from the pseudo data transmission determination unit 150 to transmit the pseudo data through the communication control unit 120, the pseudo data information storage unit 170 which sores pseudo data transmitted by the pseudo data transmission unit 160, and a storage medium 180 which stores a program for realizing the above-described processing. The storage medium 180 has the same function as that of the storage medium 80 according to the first exemplary embodiment.

Operation of these units is the same as that of the above-described first to fourth exemplary embodiments with the only difference that operation as the radio base station 2 in these exemplary embodiments is considered to be operation as the radio terminal 3.

The processing shown in the present exemplary embodiment, similarly to the first exemplary embodiment, can be realized by shifting the program stored in the storage medium 180 to the main storage unit 302 and executing the same by the CPU 301 that the radio terminal 3 has.

The present exemplary embodiment is also allowed to have the same structure and extension thereof as shown in the above-described first to fourth exemplary embodiments and obtain the same effects as those of the exemplary embodiments with the only difference in the effect attained by the use of the structure peculiar to the radio base station 2.

Effects of Fifth Exemplary Embodiment

Next, effects of the present exemplary embodiment will be described.

Since according to the present exemplary embodiment, the above-described pseudo data transmission function at the radio base station 2 is provided in the radio terminal 3, the pseudo data transmission function can be realized without the provision of the pseudo data transmission function in the radio base station 2.

Therefore, use of the present radio terminal 3 comprising the pseudo data transmission function is allowed for the radio base station 2 without an existing pseudo data transmission function, so that it is possible to make it difficult to specify an actual data communication condition between the radio base station 2 and the radio terminal 3 and possible to make it difficult to specify existence of the radio terminal 3 as well.

Sixth Exemplary Embodiment

Next, a sixth exemplary embodiment of the present invention will be described in detail with reference to the drawings.

Figure 15:
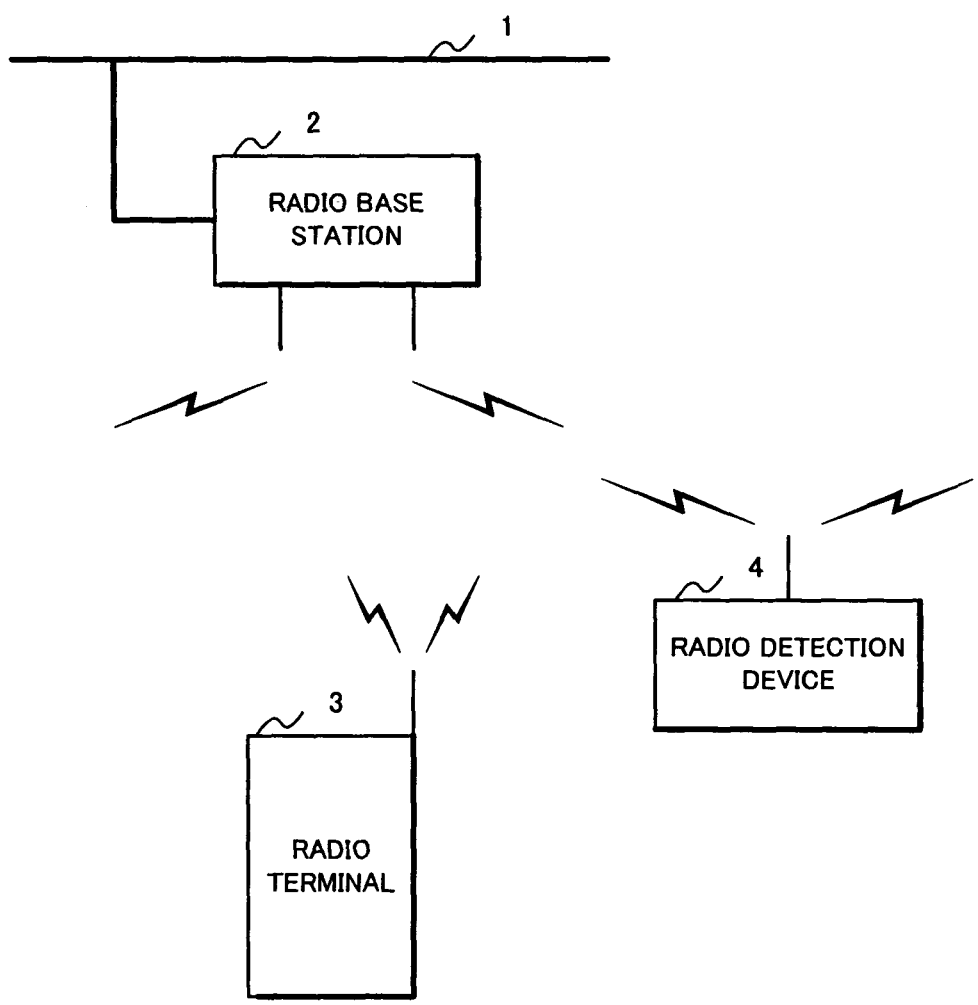
FIG. 15 is a block diagram showing a radio communication system according to a sixth exemplary embodiment of the present invention.
Figure 16:
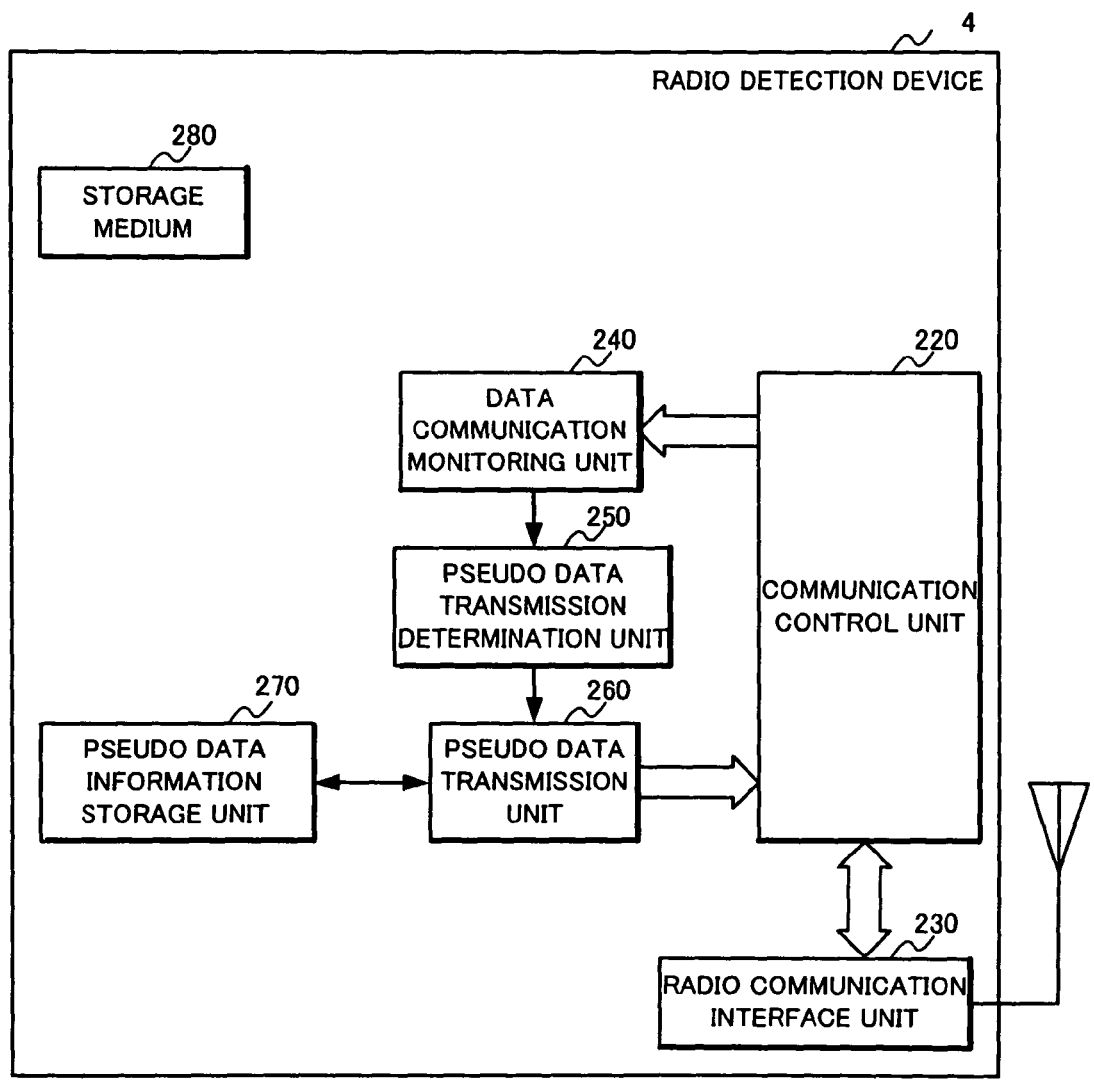
FIG. 16 is a block diagram showing a structure of a radio device according to the sixth exemplary embodiment.

FIG. 15 is a diagram showing a structure of a radio communication system according to the present exemplary embodiment and FIG. 16 is a block diagram showing a structure of a radio device 4 according to the present exemplary embodiment.

With reference to FIG. 15, the present exemplary embodiment differs from the above-described radio communication systems according to the first to fifth exemplary embodiments in having the radio detection device 4 in addition to the components of these exemplary embodiments. Description will be made mainly with respect to different points in the following.

The radio detection device 4 comprises a function of constantly monitoring conditions of data communication through radio.

In FIG. 16, the radio detection device 4 comprises a communication control unit 220 which gives a data transmission/reception instruction through a radio communication interface unit 230, the radio communication interface unit 230 in charge of data transmission/reception through a radio medium, a data communication monitoring unit 240 which obtains, through the communication control unit 220, data communication through the radio communication interface unit 230, a pseudo data transmission determination unit 250 which determines whether to start or stop pseudo data transmission based on a data communication condition obtained by the data communication monitoring unit 240, a pseudo data transmission unit 260 which generates pseudo data based on information of a pseudo data information storage unit 270 in response to an instruction from the pseudo data transmission determination unit 250 to transmit the pseudo data through the communication control unit 220, the pseudo data information storage unit 270 which stores pseudo data transmitted by the pseudo data transmission unit 260, and a storage medium 280 which stores a program for realizing the above-described processing. The storage medium 280 has the same function as that of the storage medium 80 according to the first exemplary embodiment.

Operation of these units is the same as that of the above-described first to fifth exemplary embodiments with the only difference in failing to have operation peculiar to the radio base station 2 and operation peculiar to the radio terminal 3 in these exemplary embodiments.

Next, with reference to the sequence diagram shown in FIG. 17 which illustrates how data is transmitted and received among the radio base station 2, the radio terminal 3 and the radio detection device 4 shown in FIG. 15, operation of the entire radio communication system according to the present exemplary embodiment will be described.

The processing shown in the present exemplary embodiment, similarly to the first exemplary embodiment, can be realized by shifting the program stored in the storage medium 280 to the main storage unit 302 and executing the same by the CPU 301 that the radio detection device 4 has.

Figure 17:
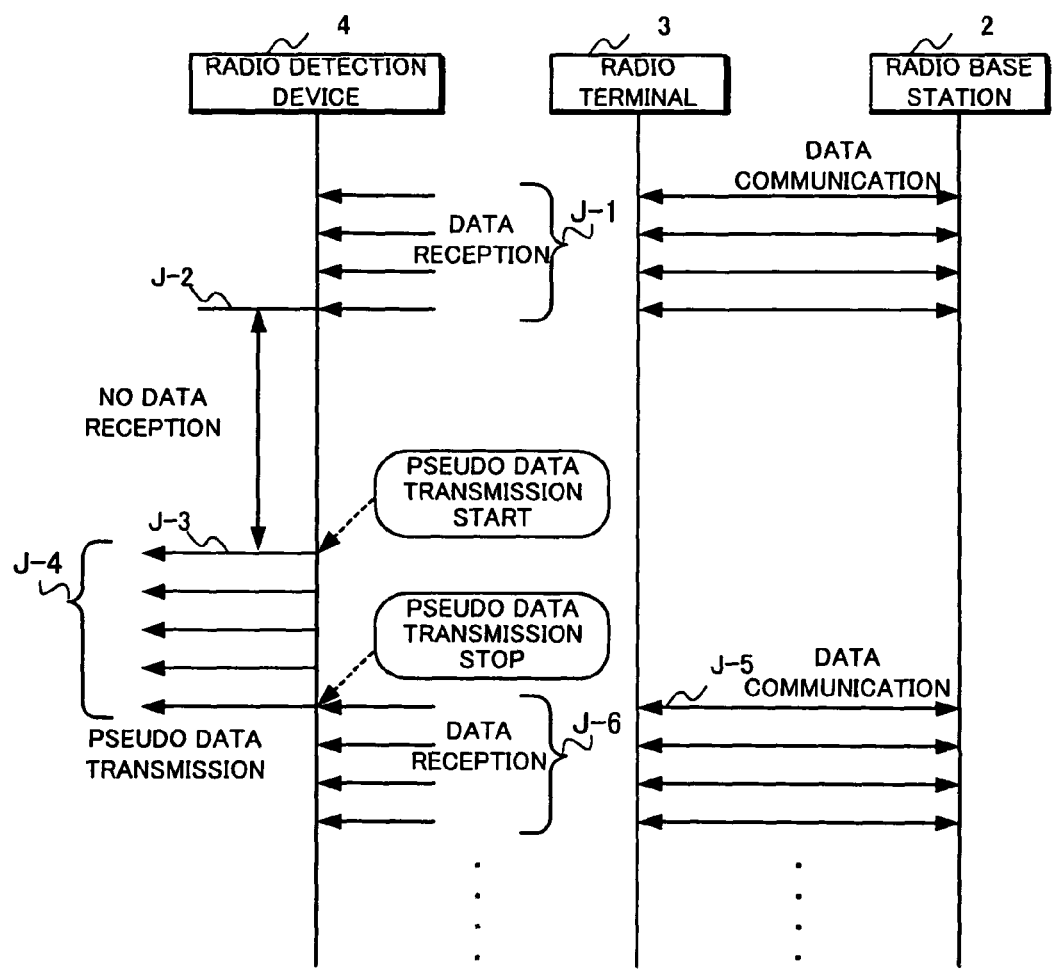
FIG. 17 is a sequence diagram showing data transmission/reception conditions in the radio device according to the sixth exemplary embodiment.

The radio detection device 4 monitors data communication between the radio terminal 3 and the radio base station 2 (J-1 in FIG. 17). Upon detecting no data communication being executed between the radio terminal 3 and the radio base station 2, the radio detection device 4 starts count-up by a timer (J-2 in FIG. 17). At a time point where the count of the timer exceeds a held timer value, the radio detection device 4 determines to start pseudo data transmission (J-3 in FIG. 17). At a time point where data communication occurs, the timer observed by the radio detection device 4 is initialized to 0.

Next, the radio detection device 4 starts pseudo data transmission (J-3 in FIG. 17). The radio detection device 4 continues pseudo data transmission until data communication occurs between the radio terminal 3 and the radio base station 2 (J-4 in FIG. 17) and at a time point of occurrence of data communication between the radio terminal 3 and the radio base station 2, stops pseudo data transmission (J-5 in FIG. 17).

The present exemplary embodiment is also allowed to have the same structure and extension thereof as shown in the above-described first to fifth exemplary embodiments.

Effects of Sixth Exemplary Embodiment

Next, effects of the present exemplary embodiment will be described.

Since according to the present exemplary embodiment, the above-described pseudo data transmission function at the radio base station 2 or pseudo data transmission function at the radio terminal 3 is provided at the radio detection device 4, pseudo data transmission function can be realized even when the radio base station 2 and the radio terminal 3 fail to have the pseudo data transmission function. The present exemplary embodiment therefore enables use of the present radio terminal 3 comprising the pseudo data transmission function for the radio base station 2 and the radio terminal 3 which fail to comprise an existing pseudo data transmission function, so that it is possible to make it difficult to specify an actual data communication condition between the radio base station 2 and the radio terminal 3 and possible to make it difficult to specify existence of the radio terminal 3 as well.

First Specific Example

Since the specific example 1 is a modification example of the first exemplary embodiment, description will be made mainly of different points.

While the communication control unit 20 according to the first exemplary embodiment is structured to transmit pseudo data instructed by the pseudo data transmission unit 60 as it is, the communication control unit 20 in the present specific example comprises a unit which enciphers a data frame by using a data encryption algorithm which is used with the radio terminal 3 to transmit pseudo data when the pseudo data is an 802.11 data frame. Encryption algorithm is, for example, TKIP, CCMP based on AES, or WEP.

The present specific example therefore further prevents an unintended third party from specifying pseudo data through taking a glance at a radio section of a data part of a pseudo data frame to be transmitted.

Second Specific Example

Since the specific example 2 is a modification example of the first exemplary embodiment, description will be made mainly of different points.

The pseudo data transmission unit 60 in the present exemplary embodiment comprises a unit which manages by itself a key for use in an encryption algorithm such as TKIP, CCMP based on AES, or WEP for pseudo data transmission and when the pseudo data is an 802.11 data frame, enciphers a pseudo transmission data frame by using the key managed by itself and then requests the communication control unit 20 to transmit enciphered pseudo data.

Therefore, the present specific example attains the effect of making it more difficult to specify being a pseudo data frame because of encryption of communication data even when the communication control unit 20 fails to have an appropriate key.

Third Specific Example

Since the specific example 3 is a modification example of the first exemplary embodiment, description will be made mainly of different points.

The radio communication interface unit 30 in the present specific example comprises a unit which changes a transmission output by a pseudo data transmission/reception address. More specifically, the radio communication interface unit 30 in the present specific example comprises a unit which changes a radio wave output at the time of sending of each of a pseudo data frame to be transmitted which is obtained by virtualizing a data frame to be transmitted to a communication partner from its own device and a pseudo data frame to be transmitted which is obtained by virtualizing a data frame to be transmitted from the communication partner's device to its own device.

Therefore, the present specific example makes it difficult to specify pseudo data by radio wave characteristics as of pseudo data reception.

Fourth Specific Example

Since the specific example 4 is a modification example of the first exemplary embodiment, description will be made mainly of different points.

In the first exemplary embodiment, as to addresses of pseudo data stored in the pseudo data information storage unit 70, a MAC address of the radio base station 2 is designated as a transmission source address of an 802.11 data frame, a MAC address of the radio terminal 3 is designated as a destination address, and as its response, the MAC address of the radio base station 2 is designated as a destination address of an 802.11 ACK frame, thereby making data communication between the radio base station 2 and the radio terminal 3 into pseudo data communication. An address which can be designated for a pseudo data frame has no limitation and any address can be designated. More specifically, provided is a unit or a combination of the same which, conversely to the above-described structure according to the first exemplary embodiment, designates, as to a pseudo data address stored in the pseudo data information storage unit 70 in the present specific example, a MAC address of the radio terminal 3 as a transmission source address of an 802.11 data frame, a MAC address of the radio base station 2 as a destination address, and as its response, the MAC address of the radio terminal 3 as a destination address of an 802.11 ACK frame, thereby making data communication between the radio base station 2 and the radio terminal 3 into pseudo data communication. In the present specific example, data communication between the radio base station 2 and other radio terminal 3 may be made into pseudo data communication or data communication between other radio terminals 3 may be made into pseudo data communication or a MAC address completely unrelated to the existing radio terminal 3 may be designated, or the foregoing described structures may be combined.

Therefore, the present specific example attains the effect of making it difficult to specify the number of the radio terminals 3 communicating with the radio base station 2 and making the existence of the radio terminal 3 unclear. In particular, when virtualizing data communication of the radio terminal 3 having voice call through the radio base station 2, for example, such a structure as to transmit a data frame from the radio base station 2 to the radio terminal 3, an ACK frame in response thereto, a data frame from the radio terminal 3 to the radio base station 2 and an ACK frame in response thereto results in having the same data sequence as that of an actual data communication condition to obtain furtherance of this effect.

Fifth Specific Example

Since the specific example 5 is a modification example of the first exemplary embodiment, description will be made mainly of different points.

While in the first exemplary embodiment, the pseudo data transmission determination unit 30 determines pseudo data transmission start, with having no communication data for a fixed time period as trigger, and determines pseudo data transmission stop at a time point where communication data occurs, the present specific example comprises a unit which constantly transmits pseudo data irrespective of communication data or a unit which makes determination based on an assignment condition of the radio terminal 3 managed by the radio base station 2 to refrain from transmitting pseudo data when assigned and transmit pseudo data when not assigned.

Therefore, the present specific example attains the effect of making it more difficult to specify actual data communication conditions and existence of the radio terminal 3 than by the above-described exemplary embodiments or specific examples.

Sixth Specific Example

Since the specific example 6 is a modification example of the first exemplary embodiment, description will be made mainly of different points.

The pseudo data transmission determination unit 30 in the present specific example comprises a unit which determines pseudo data transmission start, with having no communication data for a fixed time period as trigger, and determines pseudo data transmission stop at a time point where communication data occurs, and determines, based on an assignment condition of the radio terminal 3 managed by the radio base station 2, to refrain from transmitting pseudo data when assigned and transmit pseudo data when not assigned.

Here, a state where the radio terminal 3 is assigned to the radio base station 2 represents a state where the radio terminal 3 is allowed to execute data communication through the radio base station 2.

The present specific example therefore attains the effect of refraining from affecting compression of a communication band caused by wasteful generation of pseudo data communication related to real data communication or cut-off of an assigned state caused by transmission of an unauthorized data frame to a real radio device.

Seventh Specific Example

Since the specific example 7 is a modification example of the first exemplary embodiment, description will be made mainly of different points.

Pseudo data stored in the pseudo data information storage unit 70 according to the present specific example comprises a unit which stores actual data communication conditions obtained before.

The present specific example therefore enables a pseudo data frame to be transmitted which is difficult to distinguish from data communication actually executed.

Eighth Specific Example

Since the specific example 8 is a modification example of the second exemplary embodiment, description will be made mainly of different points.

In the present specific example, as an additional item for a pseudo data frame at the pseudo data type storage unit 73, time before a next pseudo data frame is transmitted is stored. For the first pseudo data frame G1-1~G4-1 of the pseudo data type storage unit 73, as a time before the next pseudo data frame G1-2 ~G4-2 is transmitted, SIFS (Short Interframe Space) time, that is, 10 μsec. in a case of 802.11b, is set, for example. In this case, after the first pseudo data frame G1-1~G4-1 is transmitted, the second pseudo data frame G1-2~G4-2 can be transmitted at a lapse of SIFS time: Further assume that for the second pseudo data frame G2-1~G4-2, as a time before the third pseudo data frame G1-3~G4-3 is transmitted, 10 m sec. is set. In this case, at a lapse of 10 m sec. after the transmission of the second pseudo data frame G1-2~G4-2, third pseudo data frame G1-3~G4-3 can be transmitted.

Therefore, the present specific example enables a pseudo data frame to be transmitted at the same interval as data frame transmission timing in actual communication, and in other words, attained is the effect of making it difficult to specify actual data communication because of difficulty in distinguishing between actual data communication and pseudo data communication.

Ninth Specific Example

Since the specific example 9 is a modification example of the second exemplary embodiment, description will be made mainly of different points.

While the second exemplary embodiment has only one pair of the address information storage unit 72 and the pseudo data type storage unit 73, the present specific example comprises a unit capable of storing a plurality of pairs. In this case, the pseudo data transmission determination unit 50 executes the above-described operation for each pair from the address information storage unit 72. In other words, the pseudo data transmission determination unit 50 executes operation for other pair simultaneously with operation for a certain pair. When determining to start pseudo data transmission, the pseudo data transmission determination unit 50 executes operation of notifying the pseudo data transmission unit 60 which pair of information is used to start pseudo data transmission in addition to a transmission start request. In this case, the pseudo data transmission unit 60 executes pseudo data generation and transmission operation as described above for a designated pair. When receiving a pseudo data transmission request for another pair while transmitting pseudo data for a certain pair, the pseudo data transmission unit 60 operates individually for each pair.

The present specific example therefore attains the effect of enabling not only operation of transmitting pseudo data to a specific radio device but also operation of transmitting pseudo data to other radio device at the same time.

Tenth Specific Example

Since the specific example 10 is a modification example of the third exemplary embodiment, description will be made mainly of different points.

While the pseudo data transmission unit 60 according to the third exemplary embodiment is structured to hold a value or a range of a data communication continuous period appropriate for each application type H2, and a value or a range of a waiting period between transmission of a series of pseudo data frames assuming a certain application and transmission of a series of pseudo data frames assuming a certain successive application, the pseudo data transmission unit 60 according to the present specific example preserves each value or range as a timer value and reads the same from the timer value as required.

The present specific example therefore enables a timer value to be set with ease through the pseudo data information setting unit 74 and enables a timer value to be rectified with ease.

Eleventh Specific Example

Since the specific example 11 is a modification example of the third exemplary embodiment, description will be made mainly of different points.

While the address information storage unit 72 according to the third exemplary embodiment stores only an address for one pair of devices, the address information storage unit 72 according to the specific example comprises a unit capable of storing a plurality of pairs. More specifically, the address information storage unit 72 according to the present specific example has setting of supposing two pairs of data communication, for example. In other words, the address information storage unit 72 according to the present specific example has two sets of a series of the device 1, the device 2 and the device 3 (BSSID).

Therefore, in the present specific example, the pseudo data type storage unit 73 is allowed to set the ON/OFF flag H3 for each of a plurality of pairs, that is, the two pairs here.

Twelfth Specification Example

Since the specific example 12 is a modification example of the third exemplary embodiment, description will be made mainly of different points.

The pseudo data transmission unit 60 according to the present specific example comprises a unit which first virtualizes connection negotiation between the radio base station 2 and the radio terminal 3 when starting pseudo data transmission upon a request for starting pseudo data transmission from the pseudo data transmission determination unit 50. More specifically, the pseudo data transmission unit 60 according to the present specific example transmits a pseudo data frame for transmitting and receiving an 802.11 authentication frame, transmitting and receiving an 802.11 association frame, transmitting and receiving an 802.1X authentication frame as required and exchanging a key for 802.1X authentication or WPA/WPA2.

Therefore, when data communication from the radio device 3 originally failing to exist is executed although no connection negotiation is made, being a pseudo data frame is specified due to lack of conformity of data communication, while the present specific example comprises a unit which virtualizes connection negotiation between the radio base station 2 and the radio terminal 3, so that even when no connection negotiation is executed, it is possible to prevent a pseudo data frame from being specified.

Thirteenth Specific Example

Since the specific example 13 is a modification example of the fourth exemplary embodiment, description will be made mainly of different points.

In the present specific example, the pseudo data transmission start/stop instruction unit 90 comprises correspondence information (not shown) which correlates pseudo data transmission start request and stop request and operation of an application. Upon receiving an instruction based on the correspondence information from the pseudo data transmission start/stop instruction unit 90, in a case of a voice call application, for example, the pseudo data transmission determination unit 50 requests the pseudo data transmission unit 60 to stop transmission of pseudo data at timing of a start of voice call and requests the pseudo data transmission unit 60 to start transmission of pseudo data at timing of end of voice call.

Therefore, the present specific example enables a communication application completely comprehending communication timing to more appropriately determine timing for transmitting pseudo data.

According to the present invention, it is possible to make it difficult to specify actual data communication between communication devices and when no actual data communication is executed between the communication devices, to make it look like being in data communication. The reason is that pseudo data as a pseudo of true data is transmitted by the communication unit of the communication device.

Although the present invention has been described with respect to the preferred exemplary embodiments and specific examples in the foregoing, the present invention is not necessarily limited to the above-described exemplary embodiments or specific examples and can be implemented as various modifications within a range of its technical idea.

While recited in the above-described exemplary embodiments and specific examples are, for example, structure examples using wireless LAN (IEEE 802.11) techniques, such techniques as Bluetooth, UWB (Ultra Wide Band) and WiMAX3G not limited to wireless LAN may be used or cable network techniques may be used.

This application claims priority based on Japanese Patent Application No. 2006-274701 filed on Oct. 6, 2006 and incorporates all the disclosure of the same.

INDUSTRIAL APPLICABILITY

The present invention is applicable for use in making it difficult to specify actual data communication conditions in a network system requiring a communication terminal having a radio interface. It is also applicable to radio terminals including a radio base station or other radio devices.

What is claimed is:

1. A communication device, comprising:
   a communication unit;
   a pseudo data transmission unit which transmits pseudo data that comprises a pseudo of true data in communication between said communication devices,
   a determination unit which determines whether to transmit said pseudo data or not, wherein said pseudo data transmission unit transmits said pseudo data based on a result of determination made by said determination unit,
   an obtaining unit which obtains said true data, wherein said determination unit determines whether to transmit said pseudo data or not according to a communication condition of said true data obtained by said obtaining unit, and
   a pseudo data generation information storage unit which stores pseudo data generation information for generating said pseudo data, wherein said pseudo data transmission unit generates said pseudo data based on said pseudo data generation information stored in said pseudo data generation information storage unit,
   wherein said determination unit determines to start transmission of said pseudo data at a lapse of a timer value after detecting intermission of said true data obtained by said obtaining unit and determines to stop transmission of said pseudo data upon detecting occurrence of said true data,
   wherein said pseudo data generation information storage unit stores application information related to an application for making a pseudo of said true data, and said pseudo data transmission unit generates a series of said data frames based on said application information stored in said pseudo data generation information storage unit and transmits the data frames in a predetermined order until a stop request is received, and
   wherein said pseudo data transmission unit, after selecting at random, related to said application information stored in said pseudo data generation information storage unit, one from application types indicating which of said applications is assumed to transmit said pseudo data and transmitting said pseudo data corresponding to selected said application type based on said data communication continuous time, stops transmission of said pseudo data for a random time period, again selects at random one from said application types stored in said pseudo data generation information storage unit and thereafter repeats the foregoing operation until a request for stopping transmission of said pseudo data is received.

2. The communication device according to claim 1, further comprising:
   a timer value storage unit which stores said timer value as a predetermined range, wherein said determination unit makes a determination based on said timer value selected at random within said range.

3. The communication device according to claim 1, further comprising:
   an address storage unit which stores, as address information of said pseudo data, address information of said communication device that executes communication by said true data, wherein said obtaining unit obtains only said true data with said communication device specified by said address information stored in said address storage unit.

4. The communication device according to claim 1, further comprising:
   a communication application which executes a predetermined communication function, wherein said determination unit determines whether to transmit said pseudo data or not based on operation of said communication application.

5. The communication device according to claim 1, further comprising:
   a user interface unit which accepts an instruction from a user, wherein said determination unit determines whether to transmit said pseudo data or not based on an instruction from said user interface unit.

6. The communication device according to claim 5, wherein said user interface unit comprises a button.

7. The communication device according to claim 1, wherein said pseudo data generation information storage unit stores a data frame of said pseudo data.

8. The communication device according to claim 7, wherein
   said pseudo data generation information storage unit stores a plurality of data frames of said pseudo data, and
   said pseudo data transmission unit transmits said data frames stored in said pseudo data generation information storage unit in a predetermined order and after transmitting all, repeats operation of again transmitting the data frames from the beginning in the predetermined order until a stop request is received.

9. The communication device according to claim 1, wherein
   said pseudo data generation information storage unit stores data frame generation information for generating a data frame of said pseudo data, and
   said pseudo data transmission unit generates said data frame based on said data frame generation information stored in said pseudo data generation information storage unit.

10. The communication device according to claim 1, wherein
said pseudo data generation information storage unit stores a plurality of pieces of data frame generation information for generating a data frame of said pseudo data, and
said pseudo data transmission unit generates said data frames based on said plurality of pieces of data frame generation information stored in said pseudo data generation information storage unit and transmits the data frames in a predetermined order and after transmitting all, repeats operation of again transmitting the data frames from the beginning in the predetermined order until a stop request is received.

11. The communication device according to claim 1, wherein said pseudo data generation information storage unit stores said data communication continuous time, and
said pseudo data transmission unit, after generating a series of data frames based on said application information stored in said pseudo data generation information storage unit, transmits said series of data frames in a predetermined order based on said data communication continuous time corresponding to said application which is obtained from said pseudo data generation information storage unit.

12. The communication device according to claim 1, wherein
said pseudo data generation information storage unit stores a data frame transmission time interval in communication of said true data, and
said pseudo data transmission unit transmits said pseudo data based on said data frame transmission time interval.

13. The communication device according to claim 8, wherein
said pseudo data generation information storage unit obtains address information of said true data from the address storage unit which stores address information of said true data, and
said pseudo data transmission unit uses address information of said true data at the time of generating said data frame.

14. The communication device according to claim 3, wherein said address information comprises a MAC address of said communication device.

15. The communication device according to claim 1, wherein
said pseudo data transmission unit enciphers said pseudo data and transmits the obtained data.

16. The communication device according to claim 1, wherein said communication unit changes a radio wave output at the time of transmission of said pseudo data based on a destination of said pseudo data and an address of a transmission source.

17. The communication device according to claim 1, which comprises a radio terminal that executes radio communication by said communication unit.

18. The communication device according to claim 17, which comprises a radio base station connected to a communication network to execute radio communication with said radio terminal.

19. The communication device according to claim 18, wherein based on an assignment state of said radio terminal managed by the radio base station, said radio base station refrains from transmitting pseudo data when the terminal is assigned and transmits pseudo data when not assigned.

20. The communication device according to claim 17, further comprising a function of constantly monitoring a condition of data communication through radio.

21. A communication system including a communication device according to claim 1.

22. A communication method in a communication device comprising a communication unit, said method including:
transmitting pseudo data that comprises a pseudo of true data in communication between said communication devices;
determining whether to transmit said pseudo data or not, wherein in said pseudo data transmitting, transmitting said pseudo data based on a result of determination made by said determining;
obtaining said true data, wherein in said determining, determining whether to transmit said pseudo data or not according to a communication condition of said true data obtained by said obtaining; and
storing pseudo data generation information for generating said pseudo data in a pseudo data generation information storage unit,
wherein in said determining, determining to start transmission of said pseudo data at a lapse of a timer value after detecting intermission of said true data obtained by said obtaining and determining to stop transmission of said pseudo data upon detecting occurrence of said true data,
wherein in said transmitting, generating said pseudo data based on said pseudo data generation information stored in said pseudo data generation information storage unit,
wherein in said transmitting, generating a series of said data frames based on application information related to an application for making a pseudo of said true data and transmits the data frames in a predetermined order until a stop request is received, and
wherein in said transmitting, after selecting at random, related to said application information, one from application types indicating which of said applications is assumed to transmit said pseudo data and transmitting said pseudo data corresponding to selected said application type based on said data communication continuous time, stops transmission of said pseudo data for a random time period, again selects at random one from said application types stored in said pseudo data generation information storage unit and thereafter repeats the foregoing operation until a request for stopping transmission of said pseudo data is received.

23. The communication method according to claim 22, wherein in said determining, making determination based on a timer value selected at random within a range of a timer value storage unit that stores said timer value as a predetermined range.

24. The communication method according to claim 22, further including
storing address information of said communication device that executes communication by said true data in address storage unit, as address information of said pseudo data,
wherein in said obtaining, obtaining only said true data with said communication device specified by said address information stored in said address storage unit.

25. The communication method according to claim 22, wherein in said determining, determining whether to transmit said pseudo data or not based on operation of a communication application for executing a predetermined communication function.

26. The communication method according to claim 22, wherein in said determining, determining whether to transmit said pseudo data or not based on an instruction from a user interface unit which accepts an instruction from a user.

27. The communication method according to claim 22, wherein in said pseudo data generation information storing, storing a data frame of said pseudo data.

28. The communication method according to claim 27, wherein in said pseudo data generation information storing, storing a plurality of data frames of said pseudo data, and
in said transmitting, transmitting said data frames stored in said pseudo data generation information storage unit in a predetermined order and after transmitting all, repeating operation of again transmitting the data frames from a beginning in the predetermined order until a stop request is received.

29. The communication method according to claim 22, wherein in said pseudo data generation information storing, storing data frame generation information for generating a data frame of said pseudo data, and
in said transmitting, generating said data frame based on said data frame generation information stored in said pseudo data generation information storage unit.

30. The communication method according to claim 22, wherein in said pseudo data generation information storing, storing a plurality of pieces of data frame generation information for generating a data frame of said pseudo data, and
in said transmitting, generating said data frames based on said plurality of pieces of data frame generation information stored in said pseudo data generation information storage unit and transmitting the data frames in a predetermined order and after transmitting all, repeating operation of again transmitting the data frames from a beginning in the predetermined order until a stop request is received.

31. The communication method according to claim 28, wherein in said transmitting, after generating a series of data frames based on said application information, transmitting said series of data frames in a predetermined order based on said data communication continuous time continuously transmitting said pseudo data.

32. The communication method according to claim 28, wherein in said transmitting, transmitting said pseudo data based on a data frame transmission time interval in communication of said true data.

33. The communication method according to claim 28, wherein in said pseudo data generation information storing, obtaining address information of said true data from the address storage unit which stores address information of said true data, and
in said transmitting, using address information of said true data at a time of generating said data frame.

34. The communication method according to claim 22, further including
changing a radio wave output at the time of transmission of said pseudo data based on a destination of said pseudo data and an address of a transmission source.

35. The communication method according to claim 34, wherein in said transmitting, based on an assignment state of a radio terminal managed through a communication network, refraining from transmitting pseudo data when the terminal is assigned and transmitting pseudo data when not assigned.

36. A non-transitory computer readable medium storing a communication program executed on a communication device having a communication unit, comprising:
a function of transmitting pseudo data that comprises a pseudo of true data in communication between said communication devices;
a function of determining whether to transmit said pseudo data or not, wherein in said transmitting function, transmitting said pseudo data based on a result of determination made by said determination unit; and
a function of obtaining said true data, wherein in said determination function, determining whether to transmit said pseudo data or not according to a communication condition of said true data obtained by said obtaining unit; and
a function of storing pseudo data generation information for generating said pseudo data in a pseudo data generation information storage unit,
wherein in said determination function, determining to start transmission of said pseudo data at a lapse of a timer value after detecting intermission of said true data obtained by said obtaining unit, and determining to stop transmission of said pseudo data upon detecting occurrence of said true data,
wherein in said transmitting function, generating said pseudo data based on said pseudo data generation information stored in said pseudo data generation information storage unit,
wherein in said transmitting function, generating a series of said data frames based on application information related to an application for making a pseudo of said true data and transmitting the data frames in a predetermined order until a stop request is received, and
wherein in said transmitting function, after selecting at random, related to said application information, one from application types indicating which of said applications is assumed to transmit said pseudo data and transmitting said pseudo data corresponding to selected said application type based on said data communication continuous time, stopping transmission of said pseudo data for a random time period, again selecting at random one from said application types stored in said pseudo data generation information storage unit and thereafter repeating the foregoing operation until a request for stopping transmission of said pseudo data is received.

37. The non-transitory computer readable medium according to claim 36, wherein in said determining function,
making determination based on a timer value selected at random within a range of a timer value storage unit that stores said timer value as a predetermined range.

38. The non-transitory computer readable medium according to claim 36, further comprising
a function of storing address information of said communication device that executes communication by said true data in an address storage unit, as address information of said pseudo data,
wherein in said obtaining function, obtaining only said true data with said communication device specified by said address information stored in said address storage unit.

39. The non-transitory computer readable medium according to claim 36, wherein in said determining function,
determining whether to transmit said pseudo data or not based on operation of a communication application for executing a predetermined communication function.

40. The non-transitory computer readable medium according to claim 36, wherein in said determining function,
determining whether to transmit said pseudo data or not based on an instruction from a user interface unit which accepts an instruction from a user.

41. The non-transitory computer readable medium according to claim 36, wherein in said pseudo data generation information storing function, storing a data frame of said pseudo data.

42. The non-transitory computer readable medium according to claim 41, wherein in said pseudo data generation information storing function, storing a plurality of data frames of said pseudo data, and
    in said transmitting function, transmitting said data frames stored in said pseudo data generation information storage unit in a predetermined order and after transmitting all, repeating operation of again transmitting the data frames from a beginning in the predetermined order until a stop request is received.

43. The non-transitory computer readable medium according to claim 36, wherein in said pseudo data generation information storing function, storing data frame generation information for generating a data frame of said pseudo data, and
    in said transmitting function, generating said data frame based on said data frame generation information stored in said pseudo data generation information storage unit.

44. The non-transitory computer readable medium according to claim 36, wherein in said pseudo data generation information storing function, storing a plurality of pieces of data frame generation information for generating a data frame of said pseudo data, and
    in said transmitting function, generating said data frames based on said plurality of pieces of data frame generation information stored in said pseudo data generation information storage unit and transmitting the data frames in a predetermined order and after transmitting all, repeating operation of again transmitting the data frames from a beginning in the predetermined order until a stop request is received.

45. The non-transitory computer readable medium according to claim 36, wherein in said transmitting function, after generating a series of data frames based on said application information, transmitting said series of data frames in a predetermined order based on said data communication continuous time.

46. The non-transitory computer readable medium according to claim 36, wherein in said transmitting function, transmitting said pseudo data based on a data frame transmission time interval in communication of said true data.

47. The non-transitory computer readable medium according to claim 42, wherein in said pseudo data generation information storing function, obtaining address information of said true data from the address storage unit which stores address information of said true data, and
    in said transmitting function, using address information of said true data at the time of generating said data frame.

48. The non-transitory computer readable medium according to claim 36, comprising
    a function of changing a radio wave output at the time of transmission of said pseudo data based on a destination of said pseudo data and an address of a transmission source.

49. The non-transitory computer readable medium according to claim 48, wherein in said transmitting function, based on an assignment state of a radio terminal managed through a communication network, refraining from transmitting pseudo data when the terminal is assigned and transmitting pseudo data when not assigned.

\* \* \* \* \*